United States Patent
Laramie et al.

(10) Patent No.: US 11,165,122 B2
(45) Date of Patent: *Nov. 2, 2021

(54) ELECTRODE PROTECTION USING ELECTROLYTE-INHIBITING ION CONDUCTOR

(71) Applicant: Sion Power Corporation, Tucson, AZ (US)

(72) Inventors: Michael G. Laramie, Tucson, AZ (US); Yuriy V. Mikhaylik, Tucson, AZ (US); Tracy Earl Kelley, Tucson, AZ (US); David Child, Tucson, AZ (US); Chariclea Scordilis-Kelley, Tucson, AZ (US); Veronika G. Viner, Tucson, AZ (US); Bala Sankaran, Shelby Township, MI (US)

(73) Assignee: Sion Power Corporation, Tucson, AZ (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/658,392

(22) Filed: Oct. 21, 2019

(65) Prior Publication Data

US 2020/0119324 A1    Apr. 16, 2020

Related U.S. Application Data

(63) Continuation of application No. 14/184,037, filed on Feb. 19, 2014, now Pat. No. 10,490,796.

(51) Int. Cl.
*H01M 50/449* (2021.01)
*H01M 10/052* (2010.01)
(Continued)

(52) U.S. Cl.
CPC ....... *H01M 50/449* (2021.01); *H01M 10/052* (2013.01); *H01M 50/403* (2021.01); *H01M 50/411* (2021.01)

(58) Field of Classification Search
None
See application file for complete search history.

(56) References Cited

U.S. PATENT DOCUMENTS

| 3,080,350 A | 3/1963 | Kiyokazu et al. |
| 4,664,991 A | 5/1987 | Perichaud et al. |

(Continued)

FOREIGN PATENT DOCUMENTS

| DE | 199 16 043 A1 | 10/2000 |
| JP | H10-172531 A | 6/1998 |

(Continued)

OTHER PUBLICATIONS

U.S. Appl. No. 16/407,479, filed May 9, 2019, Affinito et al.

(Continued)

*Primary Examiner* — Jonathan Crepeau
(74) *Attorney, Agent, or Firm* — Wolf, Greenfield & Sacks, P.C.

(57) ABSTRACT

The use of ion-conducting materials to protect electrodes is generally described. The ion-conducting material may be in the form of a layer that is adjacent to a polymeric layer, such as a porous separator, to form a composite. At least a portion of the pores of the polymer layer may be filled or unfilled with the ion-conducting material. In some embodiments, the ion-conducting layer is sufficiently bonded to the polymer layer to prevent delamination of the layers during cycling of an electrochemical cell.

21 Claims, 12 Drawing Sheets

(51) Int. Cl.
*H01M 50/411* (2021.01)
*H01M 50/403* (2021.01)

(56) References Cited

U.S. PATENT DOCUMENTS

| | | |
|---|---|---|
| 4,739,018 A | 4/1988 | Armand et al. |
| 4,833,048 A | 5/1989 | DeJonghe et al. |
| 4,917,974 A | 4/1990 | DeJonghe et al. |
| 4,954,371 A | 9/1990 | Yializis |
| 5,162,175 A | 11/1992 | Visco et al. |
| 5,194,341 A | 3/1993 | Bagley et al. |
| 5,324,599 A | 6/1994 | Oyama et al. |
| 5,441,831 A | 8/1995 | Okamoto et al. |
| 5,516,598 A | 5/1996 | Visco et al. |
| 5,529,860 A | 6/1996 | Skotheim et al. |
| 5,538,812 A | 7/1996 | Lee et al. |
| 5,601,947 A | 2/1997 | Skotheim et al. |
| 5,648,187 A | 7/1997 | Skotheim |
| 5,681,615 A | 10/1997 | Affinito et al. |
| 5,682,210 A | 10/1997 | Weirich |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,010,798 A | 1/2000 | Hammerschmidt et al. |
| 6,025,094 A | 2/2000 | Visco et al. |
| 6,117,590 A | 9/2000 | Skotheim et al. |
| 6,120,930 A | 9/2000 | Rouillard et al. |
| 6,134,773 A | 10/2000 | Kejha |
| 6,153,337 A | 11/2000 | Carlson et al. |
| 6,171,460 B1 | 1/2001 | Bill |
| 6,201,100 B1 | 3/2001 | Gorkovenko et al. |
| 6,214,061 B1 | 4/2001 | Visco et al. |
| 6,248,469 B1 | 6/2001 | Formato et al. |
| 6,306,215 B1 | 10/2001 | Larkin |
| 6,306,545 B1 | 10/2001 | Carlson et al. |
| 6,402,795 B1 | 6/2002 | Chu et al. |
| 6,413,284 B1 | 7/2002 | Chu et al. |
| 6,413,285 B1 | 7/2002 | Chu et al. |
| 6,432,584 B1 | 8/2002 | Visco et al. |
| 6,488,721 B1 | 12/2002 | Carlson |
| 6,544,688 B1 | 4/2003 | Cheng |
| 6,737,197 B2 | 5/2004 | Chu et al. |
| 6,991,662 B2 | 1/2006 | Visco et al. |
| 7,069,836 B1 | 7/2006 | Palicka et al. |
| 7,070,632 B1 | 7/2006 | Visco et al. |
| 7,081,142 B1 | 7/2006 | Carlson |
| 7,160,603 B2 | 1/2007 | Carlson |
| 7,175,937 B2 | 2/2007 | Cho et al. |
| 7,247,408 B2 | 7/2007 | Skotheim et al. |
| 7,771,870 B2 | 8/2010 | Affinito et al. |
| 7,785,730 B2 | 8/2010 | Affinito et al. |
| 8,076,024 B2 | 12/2011 | Affinito et al. |
| 8,087,309 B2 | 1/2012 | Kelley et al. |
| 8,105,717 B2 | 1/2012 | Skotheim et al. |
| 8,114,171 B2 | 2/2012 | Visco et al. |
| 8,139,343 B2 | 3/2012 | Gibson et al. |
| 8,182,943 B2 | 5/2012 | Visco et al. |
| 8,197,971 B2 | 6/2012 | Skotheim et al. |
| 8,202,649 B2 | 6/2012 | Visco et al. |
| 8,329,343 B2 | 12/2012 | Yamaguchi et al. |
| 8,334,075 B2 | 12/2012 | Visco et al. |
| 8,338,034 B2 | 12/2012 | Affinito et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Sempere et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,397,342 B2 | 7/2016 | Skotheim et al. |
| 9,548,492 B2 | 1/2017 | Affinito et al. |
| 9,653,735 B2 | 5/2017 | Skotheim et al. |
| 9,653,750 B2 | 5/2017 | Laramie et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,853,305 B2 | 12/2017 | Yamakawa et al. |
| 9,994,959 B2 | 6/2018 | Laramie et al. |
| 9,994,960 B2 | 6/2018 | Laramie et al. |
| 10,333,134 B2 | 6/2019 | Mikhaylik et al. |
| 10,333,149 B2 | 6/2019 | Affinito et al. |
| 10,490,796 B2 | 11/2019 | Laramie et al. |
| 10,553,893 B2 | 2/2020 | Laramie et al. |
| 10,862,105 B2 | 12/2020 | Gronwald et al. |
| 2001/0036573 A1 | 11/2001 | Jen et al. |
| 2002/0012846 A1 | 1/2002 | Skotheim et al. |
| 2002/0034688 A1 | 3/2002 | Chu et al. |
| 2002/0144899 A1 | 10/2002 | Arcella et al. |
| 2004/0142244 A1 | 7/2004 | Visco et al. |
| 2004/0197629 A1 | 10/2004 | Arishima et al. |
| 2004/0209159 A1 | 10/2004 | Lee et al. |
| 2004/0253510 A1 | 12/2004 | Jonghe et al. |
| 2005/0008938 A1 | 1/2005 | Cho et al. |
| 2005/0095504 A1 | 5/2005 | Kim et al. |
| 2006/0115579 A1 | 6/2006 | Mukherjee et al. |
| 2006/0121345 A1 | 6/2006 | Yasuda et al. |
| 2006/0130320 A1 | 6/2006 | Murosawa et al. |
| 2006/0147801 A1 | 7/2006 | Yasuda et al. |
| 2006/0147802 A1 | 7/2006 | Yasuda et al. |
| 2006/0180269 A1 | 8/2006 | Karatsu et al. |
| 2006/0222954 A1 | 10/2006 | Skotheim et al. |
| 2006/0238203 A1 | 10/2006 | Kelley et al. |
| 2007/0072036 A1 | 3/2007 | Berta et al. |
| 2007/0106057 A1 | 5/2007 | Watanabe et al. |
| 2007/0122716 A1 | 5/2007 | Seo et al. |
| 2007/0166617 A1 | 7/2007 | Gozdz et al. |
| 2007/0221265 A1 | 9/2007 | Affinito et al. |
| 2007/0224502 A1 | 9/2007 | Affinito et al. |
| 2008/0014501 A1 | 1/2008 | Skotheim et al. |
| 2008/0020923 A1 | 1/2008 | Debe et al. |
| 2008/0057397 A1 | 3/2008 | Skotheim et al. |
| 2008/0187663 A1 | 8/2008 | Affinito |
| 2008/0190841 A1 | 8/2008 | Pascaly et al. |
| 2008/0213672 A1 | 9/2008 | Skotheim et al. |
| 2008/0318128 A1 | 12/2008 | Simoneau et al. |
| 2009/0029259 A1 | 1/2009 | Okazaki et al. |
| 2009/0061288 A1 | 3/2009 | Gordon et al. |
| 2009/0130547 A1 | 5/2009 | Lee et al. |
| 2009/0155676 A1 | 6/2009 | Zhamu et al. |
| 2009/0197158 A1 | 8/2009 | Ogawa et al. |
| 2009/0200986 A1 | 8/2009 | Kopera |
| 2009/0226809 A1 | 9/2009 | Vu et al. |
| 2009/0280410 A1 | 11/2009 | Zaguib et al. |
| 2009/0291353 A1 | 11/2009 | Affinito et al. |
| 2009/0305141 A1 | 12/2009 | Lee et al. |
| 2010/0035128 A1 | 2/2010 | Scordilis-Kelley et al. |
| 2010/0112454 A1 | 5/2010 | Visco et al. |
| 2010/0129699 A1 | 5/2010 | Mikhaylik et al. |
| 2010/0227228 A1 | 9/2010 | Yamazaki et al. |
| 2010/0233547 A1 | 9/2010 | Baba et al. |
| 2010/0239914 A1 | 9/2010 | Mikhaylik et al. |
| 2010/0291442 A1 | 11/2010 | Wang et al. |
| 2010/0327811 A1 | 12/2010 | Affinito et al. |
| 2011/0033784 A1 | 2/2011 | Ljungcrantz et al. |
| 2011/0059361 A1 | 3/2011 | Wilkening et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0177398 A1 | 7/2011 | Affinito et al. |
| 2011/0206992 A1 | 8/2011 | Campbell et al. |
| 2011/0244336 A1 | 10/2011 | Schmitz et al. |
| 2011/0311856 A1 | 12/2011 | Matusi et al. |
| 2012/0043940 A1 | 2/2012 | Affinito et al. |

(56) References Cited

U.S. PATENT DOCUMENTS

| | | |
|---|---|---|
| 2012/0048729 A1 | 3/2012 | Mikhaylik et al. |
| 2012/0052397 A1 | 3/2012 | Mikhaylik et al. |
| 2012/0070746 A1 | 3/2012 | Mikhaylik et al. |
| 2012/0214043 A1 | 8/2012 | Olschimke et al. |
| 2012/0219842 A1 | 8/2012 | Visco et al. |
| 2012/0270112 A1 | 10/2012 | Visco et al. |
| 2012/0276449 A1 | 11/2012 | Skotheim et al. |
| 2012/0276459 A1 | 11/2012 | Im et al. |
| 2012/0301774 A1 | 11/2012 | Jiang et al. |
| 2012/0305390 A1 | 12/2012 | Fredenberg et al. |
| 2013/0004852 A1 | 1/2013 | Visco et al. |
| 2013/0017441 A1 | 1/2013 | Affinito et al. |
| 2013/0059192 A1 | 3/2013 | Kajita et al. |
| 2013/0095380 A1 | 4/2013 | Affinito et al. |
| 2013/0143096 A1 | 6/2013 | Affinito et al. |
| 2013/0149587 A1 | 6/2013 | Yu et al. |
| 2013/0216915 A1 | 8/2013 | Affinito et al. |
| 2013/0224601 A1 | 8/2013 | Burnside et al. |
| 2013/0252103 A1 | 9/2013 | Mikhaylik et al. |
| 2013/0266842 A1 | 10/2013 | Woehrle et al. |
| 2013/0280605 A1 | 10/2013 | Affinito et al. |
| 2014/0045075 A1 | 2/2014 | Skotheim et al. |
| 2014/0062411 A1 | 3/2014 | Mikhaylik et al. |
| 2014/0072873 A1 | 3/2014 | Wang et al. |
| 2014/0079994 A1 | 3/2014 | Affinito et al. |
| 2014/0123477 A1 | 5/2014 | Sempere et al. |
| 2014/0127419 A1 | 5/2014 | Fleischmann et al. |
| 2014/0127577 A1 | 5/2014 | Fleischmann et al. |
| 2014/0205912 A1 | 7/2014 | Skotheim et al. |
| 2014/0272565 A1 | 9/2014 | Gronwald et al. |
| 2014/0272594 A1 | 9/2014 | Sempere et al. |
| 2014/0272597 A1 | 9/2014 | Mikhaylik et al. |
| 2015/0010804 A1 | 1/2015 | Laramie et al. |
| 2015/0044517 A1 | 2/2015 | Mikhaylik et al. |
| 2015/0086837 A1 | 3/2015 | Laramie et al. |
| 2015/0162586 A1 | 6/2015 | Fleischmann et al. |
| 2015/0180037 A1 | 6/2015 | Gronwald et al. |
| 2015/0236320 A1 | 8/2015 | Laramie et al. |
| 2015/0236322 A1 | 8/2015 | Laramie et al. |
| 2015/0280277 A1 | 10/2015 | Fleischmann et al. |
| 2015/0287986 A1 | 10/2015 | Affinito et al. |
| 2015/0318552 A1 | 11/2015 | Skotheim et al. |
| 2015/0349310 A1 | 12/2015 | Viner et al. |
| 2016/0072132 A1 | 3/2016 | Liao et al. |
| 2016/0118638 A1 | 4/2016 | Gronwald et al. |
| 2016/0118651 A1 | 4/2016 | Kovalev et al. |
| 2016/0301080 A1 | 10/2016 | Skotheim et al. |
| 2017/0141402 A1 | 5/2017 | Affinito et al. |
| 2017/0250390 A1 | 8/2017 | Laramie et al. |
| 2017/0352863 A1 | 12/2017 | Mikhaylik et al. |
| 2017/0373321 A1 | 12/2017 | Skotheim et al. |
| 2018/0230610 A1 | 8/2018 | Laramie et al. |
| 2019/0229323 A1 | 7/2019 | Mikhaylik et al. |
| 2019/0267632 A1 | 8/2019 | Affinito et al. |
| 2020/0194822 A1 | 6/2020 | Laramie et al. |
| 2021/0135192 A1 | 5/2021 | Gronwald et al. |

FOREIGN PATENT DOCUMENTS

| | | |
|---|---|---|
| JP | 2001-085065 A | 3/2001 |
| JP | 2008-103259 A | 5/2008 |
| JP | 2008-152985 A | 7/2008 |
| JP | 2009-516325 A | 4/2009 |
| JP | 2010-050076 A | 3/2010 |
| JP | 2010-073339 A | 4/2010 |
| JP | 2011-168935 A | 9/2011 |
| JP | 2011-253673 A | 12/2011 |
| JP | 2012-022835 A | 2/2012 |
| JP | 2014-086174 A | 5/2014 |
| WO | WO 99/033125 A1 | 7/1999 |
| WO | WO 99/033130 A1 | 7/1999 |
| WO | WO 03/99556 A1 | 12/2003 |
| WO | WO 2004/036669 A2 | 4/2004 |
| WO | WO 2007/075867 A2 | 7/2007 |
| WO | WO 2007/111895 A2 | 10/2007 |
| WO | WO 2008/070059 A2 | 6/2008 |
| WO | WO 2009/017726 A1 | 2/2009 |
| WO | WO 2009/029270 A1 | 3/2009 |
| WO | WO 2009/042071 A2 | 4/2009 |
| WO | WO 2009/043011 A1 | 4/2009 |
| WO | WO 2009/054987 A1 | 4/2009 |
| WO | WO 2009/089018 A2 | 7/2009 |
| WO | WO 2011/023110 A1 | 3/2011 |
| WO | WO 2011/028251 A2 | 3/2011 |
| WO | WO 2011/147723 A1 | 12/2011 |
| WO | WO 2012/025543 A1 | 3/2012 |
| WO | WO 2012/156903 A1 | 11/2012 |
| WO | WO 2013/072224 A1 | 5/2013 |
| WO | WO 2014/032948 A1 | 3/2014 |

OTHER PUBLICATIONS

U.S. Appl. No. 16/369,027, filed Mar. 29, 2019, Mikhaylik et al.
U.S. Appl. No. 14/209,396, filed Mar. 13, 2014, Gronwald et al.
U.S. Appl. No. 15/953,734, filed Apr. 16, 2018, Laramie et al.
U.S. Appl. No. 15/459,152, filed Mar. 15, 2017, Laramie et al.
U.S. Appl. No. 16/716,363, filed Dec. 16, 2019, Laramie et al.
EP10814062.5, dated Nov. 7, 2013, Extended European Search Report.
PCT/US2010/002326, dated May 23, 2011, International Search Report and Written Opinion.
PCT/US2014/025618, dated Jun. 27, 2014, International Search Report and Written Opinion.
PCT/EP2014/054994, dated May 6, 2014, International Search Report and Written Opinion.
EP 14882852.8, dated Aug. 23, 2017, Extended European Search Report.
PCT/US2014/017093, dated Nov. 18, 2014, International Search Report and Written Opinion.
PCT/US2014/017093, dated Sep. 1, 2016, International Preliminary Report on Patentability.
EP15155510.9, dated Jul. 7, 2015, Extended European Search Report.
PCT/US2015/016281, dated Jun. 18, 2015, International Search Report and Written Opinion.
U.S. Appl. No. 17/091,232, filed Nov. 6, 2020, Gronwald et al.
Extended European Search Report for EP10814062.5 dated Nov. 7, 2013.
International Search Report and Written Opinion for PCT/US2010/002326 dated May 23, 2011.
International Search Report and Written Opinion for PCT/US2014/025618 dated Jun. 27, 2014.
International Search Report and Written Opinion for PCT/EP2014/054994 dated May 6, 2014.
Extended European Search Report for EP 14882852.8 dated Aug. 23, 2017.
International Search Report and Written Opinion for PCT/US2014/017093 dated Nov. 18, 2014.
International Preliminary Report on Patentability for PCT/US2014/017093 dated Sep. 1, 2016.
Extended European Search Report for EP 15155510.9 dated Jul. 7, 2015.
International Search Report and Written Opinion for PCT/US2015/016281 dated Jun. 18, 2015.
[No Author Listed] Chemical Properties of Ethyl Vinyl Ether. 2008. Accessed on Apr. 11, 2014 at http://www.chemicalbook.com/ProductChemicalPropertiesCB0708241_EN.htm.
[No Author Listed] SYL-OFF Formulation Guide. Dow Corning Corporation. 2007:16 pages.
Addae-Mensan et al., Poly(vinyl alcohol) as a structure release layer for the microfabrication of polymer composite structures. J Micromech Microeng. 2007; 17:N41-N46.
Alamgir et al., Lithium Batteries, New Materials, Developments and Perspectives, Chapter 3. Elsevier, Amsterdam. 1994; 93-136.
Dominey, Lithium Batteries, New Materials, Developments and Perspectives, Chapter 4. Elsevier, Amsterdam. 1994; 137-165.
Kim et al., Surface-modified membrane as a separator for lithium-ion polymer battery. Energies. Apr. 23, 2010; 3:866-885.

(56) References Cited

OTHER PUBLICATIONS

Nakamatsu et al., Nanoimprint and Lift-Off Process Using Poly(vinyl alcohol). Jap J Appl Phys. 2005; 44(11):8186-8188.
Saxena, Polyvinyl Alcohol Chemical and Technical Assessment. Joint FAO/WHO Expert Committee on Food Additives, Food and Agriculture Organization. 2004:3 pages.

ELECTRODE PROTECTION USING ELECTROLYTE-INHIBITING ION CONDUCTOR

RELATED APPLICATIONS

This application is a continuation of U.S. application Ser. No. 14/184,037, filed Feb. 19, 2014, which is incorporated herein by reference in its entirety.

TECHNICAL FIELD

The use of ion-conducting materials to protect electrodes is generally described.

BACKGROUND

Rechargeable and primary electrochemical cells oftentimes include one or more protective layers to protect the electroactive surface. Depending upon the specific protective layer(s), the protective layer(s) isolates the underlying electroactive surface from interactions with the electrolyte and/or other components within the electrochemical cell. In order to provide appropriate protection of the underlying electrode, it is desirable that the protective layer(s) continuously cover the underlying electrode and exhibit a minimal number of defects. Although techniques for forming protective layer(s) exist, methods that would allow formation of protective layer(s) that would improve the performance of an electrochemical cell would be beneficial.

SUMMARY

Ion-conducting materials used to protect electrodes, and associated systems and methods, are generally described. In certain embodiments, the ion-conducting material can inhibit interaction between the protected electrode and an electrolyte.

The ion-conducting material may be in the form of, according to certain embodiments, a plurality of vias of ion-conducting material at least partially surrounded by a separator matrix. In some embodiments, the ion-conducting material may be disordered.

In other embodiments, the ion-conducting material may be in the form of a film positioned adjacent a separator. The ion-conducting material may be optionally bonded to the separator.

Some embodiments relate to the protection of a lithium-based electrode. The subject matter of the present invention involves, in some cases, interrelated products, alternative solutions to a particular problem, and/or a plurality of different uses of one or more systems and/or articles.

In certain embodiments, an electrochemical cell is provided. The electrochemical cell comprises, in some embodiments, a first electrode comprising a first electroactive material; a second electrode; and a separator between the first and second electrodes, comprising pores in which electrolyte can reside, and comprising a region proximate the first electrode in which the pores are substantially filled with an ion conductor that inhibits interaction of electrolyte with the first electroactive material.

In one set of embodiments, an electrochemical cell comprises a first electrode comprising an electroactive material, a second electrode, and a composite positioned between the first and second electrodes. The composite comprises a separator comprising pores having an average pore size, wherein the separator has a bulk electronic resistivity of at least $10^4$ Ohm-meters; and an inorganic ion conductor layer bonded to the separator, wherein a ratio of a thickness of the inorganic ion conductor layer to the average pore size of the separator is at least 1.1:1.

In certain embodiments, an electrochemical cell comprises a first electrode comprising an electroactive material, a second electrode, and a composite positioned between the first and second electrodes. The composite comprises a separator comprising pores having an average pore size, wherein the separator has a bulk electronic resistivity of at least $10^4$ Ohm-meters. The composite also includes an inorganic ion conductor layer adjacent to the separator, wherein the inorganic ion conductor layer has a thickness of less than or equal to 1.5 microns. The composite has an air permeation time of at least 20,000 Gurley-s according to Gurley test TAPPI Standard T 536 om-12.

In certain embodiments, an electrochemical cell comprises a first electrode comprising an electroactive material, a second electrode, and a composite positioned between the first and second electrodes. The composite comprises a separator comprising pores having an average pore size, wherein the separator has a bulk electronic resistivity of at least $10^4$ Ohm meters. The composite also includes an inorganic ion conductor layer bonded to the separator. The inorganic ion conductor layer is bonded to the separator by covalent bonding and has an ion conductivity of least at least $10^{-7}$ S/cm.

In certain embodiments, a method of forming a component for an electrochemical cell is provided. The method comprises providing a separator comprising pores having an average pore size and a surface having a first surface energy, and having a bulk electronic resistivity of at least $10^4$ Ohm meters. The method involves increasing the surface energy of the surface of the separator to a second surface energy in a pre-treatment step, wherein the second surface energy is at least 60 dynes. The method involves depositing an inorganic ion conductor layer on the surface of the separator. The inorganic ion conductor layer may have an ion conductivity of least at least $10^{-6}$ S/cm and a thickness of less than or equal to 2 microns.

In certain embodiments, a method of forming a component for an electrochemical involves providing a separator comprising pores having an average pore size and a surface having a first surface energy, and having a bulk electronic resistivity of at least about $10^4$ Ohm meters, subjecting the surface of the separator to a plasma in a pre-treatment step, and depositing an inorganic ion conductor layer on the surface of the separator. The inorganic ion conductor layer may have an ion conductivity of least at least $10^{-6}$ S/cm and a thickness of less than or equal to 2 microns.

In some embodiments a series of components for an electrochemical cell are provided. In one set of embodiments, a component comprises a separator comprising pores having an average pore size, and an inorganic ion conductor layer bonded to the separator, wherein a ratio of a thickness of the inorganic ion conductor layer to the average pore size of the separator is at least 1.1:1.

In another set of embodiments, a component comprises a separator comprising pores having an average pore size, and an inorganic ion conductor layer bonded to the separator, wherein the inorganic ion conductor layer is bonded to the separator by covalent bonding.

In another set of embodiments, a component comprises a composite comprising a separator comprising pores having an average pore size, wherein the separator has a bulk electronic resistivity of at least $10^4$ Ohm-meters. The composite also includes an inorganic ion conductor layer adjacent to the separator, wherein the inorganic ion conductor layer has a thickness of less than or equal to 1.5 microns. The composite has an air permeation time of at least 20,000 Gurley-s according to Gurley test TAPPI Standard T 536 om-12.

In another embodiment, the composite comprises a separator between the first and second electrodes, comprising pores in which electrolyte can reside, and comprising a region proximate the first electrode in which the pores are substantially filled with an ion conductor that inhibits interaction of electrolyte with the first electroactive material.

The composites described herein may be configured to or capable of being arranged between a first electrode and a second electrode of an electrochemical cell.

Use of a composite described above and herein for separating a first electrode and a second electrode of an electrochemical cell (e.g., a lithium sulfur cell) and for inhibiting interaction of an electrolyte present in an electrochemical cell with one of the electrodes of the electrochemical cell, is also provided.

In some embodiments involving the electrochemical cells described above and herein, the ion conductor layer is a part of a multi-layered structure comprising more than one ion conductor layers. In some instances, at least two layers of the multi-layered structure are formed of different materials. In other instances, at least two layers of the multi-layered structure are formed of the same material. The ion conductor layer may be in direct contact with each of the first electrode and the separator.

In some embodiments involving the electrochemical cells described above and herein, the separator has a thickness between 5 microns and 40 microns. The separator may have a bulk electronic resistivity of at least $10^{10}$ Ohm meters, e.g., between $10^{10}$ Ohm meters and $10^{15}$ Ohm meters.

In some embodiments involving the electrochemical cells described above and herein, the separator is a solid, polymeric separator. In some cases, the separator is a solid comprising a mixture of a polymeric binder and filler comprising a ceramic or a glassy/ceramic material. In certain embodiments, the separator comprises one or more of poly (n-pentene-2), polypropylene, polytetrafluoroethylene, a polyamide (e.g., polyamide (Nylon), poly(ε-caprolactam) (Nylon 6), poly(hexamethylene adipamide) (Nylon 66)), a polyimide (e.g., polynitrile, and poly(pyromellitimide-1,4-diphenyl ether) (Kapton®) (NOMEX®) (KEVLAR®)), polyether ether ketone (PEEK), and combinations thereof.

In some embodiments involving the electrochemical cells described above and herein, the composite is formed by subjecting a surface of the separator to a plasma prior to depositing the ion conductor layer on the surface of the separator.

In some embodiments involving the electrochemical cells described above and herein, the composite may be a free-standing structure.

In some embodiments involving the electrochemical cells described above and herein, the ion conductor layer comprises a glass forming additive ranging from 0 wt % to 30 wt % of the inorganic ion conductor material.

In some embodiments involving the electrochemical cells described above and herein, the ion conductor layer comprises one or more lithium salts. A lithium salt may include, for example, LiI, LiBr, LiCl, $Li_2CO_3$, and/or $Li_2SO_4$. The one or more lithium salts is added to the inorganic ion conductor material at a range of, e.g., 0 to 50 mol %.

In some embodiments involving the electrochemical cells described above and herein, the separator has an average pore size of less than or equal to 5 microns, less than or equal to 1 micron, less than or equal to 0.5 microns, between 0.05-5 microns, or between 0.1-0.3 microns.

In some embodiments involving the electrochemical cells described above and herein, the ion conductor layer has a thickness of less than or equal to 2 microns, less than or equal to 1.5 microns, less than or equal to 1 micron, less than or equal to 800 nm, less than or equal to 600 nm, between 400 nm and 600 nm, or in the range of from 1 nm to 7 microns.

In some embodiments involving the electrochemical cells described above and herein, the composite has a lithium ion conductivity of at least $10^{-5}$ S/cm, at least $10^{-4}$ S/cm, or at least $10^{-3}$ S/cm at 25 degrees Celsius.

In some embodiments involving the electrochemical cells described above and herein, a ratio of a thickness of the ion conductor layer to the average pore size of the separator is at least 1.1:1, at least 2:1, at least 3:1 or at least 5:1.

In some embodiments involving the electrochemical cells described above and herein, a strength of adhesion between the separator and the ion conductor layer is at least 350 N/m or at least 500 N/m. In some instances, a strength of adhesion between the separator and the ion conductor layer passes the tape test according to the standard ASTM D3359-02.

In some embodiments involving the electrochemical cells described above and herein, the first electroactive material comprises lithium; e.g., the first electroactive material may comprise lithium metal and/or a lithium alloy. In some cases, the second electrode comprises sulfur as a second electroactive material.

In some embodiments involving the electrochemical cells described above and herein, the ion conductor is deposited onto the separator by electron beam evaporation or by a sputtering process.

In some embodiments involving the electrochemical cells described above and herein, said solid ion conductor is placed against one of said first and second electrodes. The solid ion conductor may be arranged to inhibit interaction of an electrolyte present in the electrochemical cell with the electrode against which it is placed.

In some embodiments involving the electrochemical cells described above and herein, the solid ion conductor comprises an amorphous lithium-ion conducting oxysulfide, a crystalline lithium-ion conducting oxysulfide or a mixture of an amorphous lithium-ion conducting oxysulfide and a crystalline lithium-ion conducting oxysulfide, e.g., an amorphous lithium oxysulfide, a crystalline lithium oxysulfide, or a mixture of an amorphous lithium oxysulfide and a crystalline lithium oxysulfide.

In some embodiments involving the electrochemical cells described above and herein, the present invention relates to the use of a composite configured to or capable of being arranged between a first electrode and a second electrode, the composite comprising a separator, and a solid ion conductor contacting and/or bonded to the separator, for separating a first electrode and a second electrode of an electrochemical cell, e.g., in a lithium sulfur cell. The solid ion conductor may be configured and arranged for inhibiting interaction of an electrolyte present in an electrochemical cell with one of said electrodes of said electrochemical cell.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
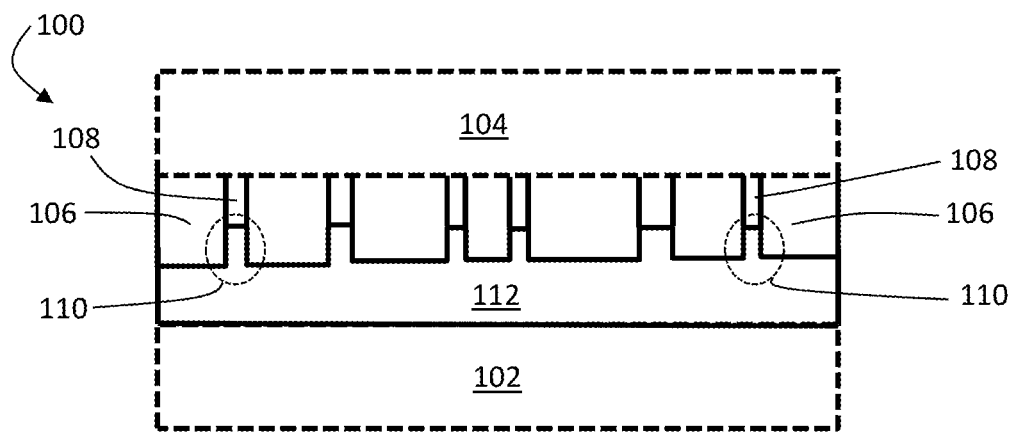
FIGS. 1A and 1B are exemplary schematic illustrations of electrochemical cells including composite structures comprising an ion conductor layer and a polymer layer (e.g., separator), according to one set of embodiments.

Ion-conducting materials used to protect electrodes, and associated systems and methods, are generally described.

Layers of ceramic or other inorganic protective materials (e.g., glasses, glassy-ceramics) have been used to protect electrodes (e.g., lithium anodes) from adverse interaction with electrolyte material during operation of electrochemical cells. For example, protected lithium anode (PLA) structures have been employed comprising alternating continuous layers of ionically conductive ceramic and ionically conductive polymer. In certain cases, such protective electrode structures can be ineffective. For example, the brittleness of the ceramic, defects in the ceramic, and/or the swelling exhibited by the polymer upon exposure to the electrolyte can cause the protective electrode structure to crack or otherwise fail. The cascade failure of these layers can stem from the initial defects in the ceramic, which may be present from handling and/or from processing. This in turn allows the electrolyte to seep in and swell the polymer layer. The swelling of this layer can break the ceramic layers below and the electrolyte penetrates further to swell more polymer layers. This can eventually destroy all the protected layers, which can lead to failure of the electrochemical cell.

One approach described herein that can be used to address these issues is using an ion conductor to substantially fills pores within a separator. The ion conductor can be configured to penetrate from the electrode (e.g., a lithium layer, or other electrode) to a region in which the ion conductor contacts the electrolyte.

Another approach described herein that can be used to address the issues outlined above with respect to ineffective electrode protective structures involves disposing an ion conductor on the surface of the separator. In such embodiments, the separator can act as a smooth substrate to which a smooth, thin ion conductor layer can be deposited, and the pores may or may not be filled with an ion conductor. Prior to deposition of the ion conductor layer, the surface of the separator may be treated to enhance its surface energy. The increased surface energy of the separator can allow improved adhesion (e.g., bonding) between the ion conductor layer and the separator compared to when the surface of the separator is not treated, as described below. As a result of increased adhesion between the layers, the likelihood of delamination of the layers can be reduced, and the mechanical stability of the ion conductor layer can be improved during cycling of the cell. Additionally, since both the separator and the ion conductor layer can be included in an electrochemical cell, the ion conductor layer does not need to be released from a substrate. The avoidance of releasing the ion conductor layer may, in some cases, improve the mechanical integrity of the ion conductor layer. In certain embodiments, the resulting ion conductor layer-separator composite can enhance the ion conductor layer's ability to withstand the mechanical stresses encountered when it is placed in a pressurized cell against a rough cathode. Other advantages are described in more detail below.

As used herein, when a layer is referred to as being "on", "on top of", or "adjacent" another layer, it can be directly on, on top of, or adjacent the layer, or an intervening layer may also be present. A layer that is "directly on", "directly adjacent" or "in contact with" another layer means that no intervening layer is present. Likewise, a layer that is positioned "between" two layers may be directly between the two layers such that no intervening layer is present, or an intervening layer may be present.

An approach involving filling all or portions of the pores of the separator is now described.

In some embodiments, the ion conductor comprises protrusions that extend into the separator. In some such embodiments, the protrusions can be in contact with an ion conductor material, which can be made of a material that is the same as or different from the ion conductor material in the protrusions. In some embodiments, the ion conductor can be present in the form of a plurality of discontinuous regions (e.g., in the form of particles). In certain embodiments in which the ion conductor is present in such forms, the loss of function of one ion conducting element does not greatly affect the entire structure.

In certain embodiments, the ion conductor regions can be in contact with a separator material (e.g., a polymer separator). The separator material can be flexible, in certain embodiments, which can inhibit (and/or prevent) mechanical failure of other adverse mechanical impact (e.g., plastic deformation) when changes in dimension are introduced to the structure (e.g., via swelling). The separator material may or may not be ionically conductive, which can allow for the use of a wide variety of separator materials (e.g., polymers that do or do not swell upon exposure to electrolyte). By adopting designs with such spatial orientations of the ion conductor and the separator, one can, according to certain embodiments, remove constraints on the materials that are used, which can allow for the use of already existing materials.

Figure 1B:
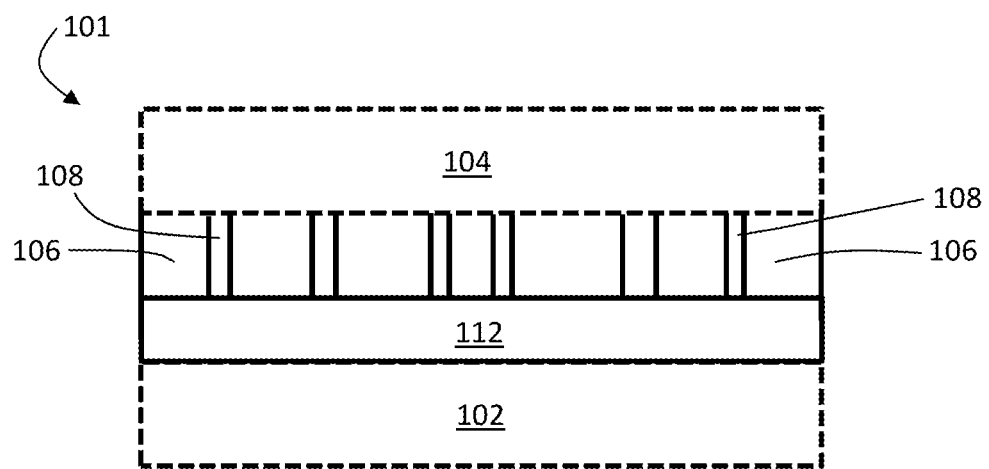

FIGS. 1A and 1B are exemplary cross-sectional schematic illustrations of electrochemical cells comprising an ion conductor and a separator, according to one set of embodiments. FIG. 1A shows at least a portion of the pores of the separator being filled with an ion conductor, and FIG. 1B shows pores of the separator being substantially unfilled by an ion conductor. In FIGS. 1A and 1B, electrochemical cells 100 and 101 comprises first electrode 102 and second electrode 104. First electrode 102 (and/or second electrode 104) comprises an electroactive material, according to some embodiments. In certain embodiments, the electroactive material in first electrode 102 comprises lithium. In some embodiments, first electrode 102 is a negative electrode and second electrode 104 is a positive electrode.

In the exemplary embodiments of FIGS. 1A and 1B, electrochemical cells 100 and 101 comprise a separator 106 between first electrode 102 and second electrode 104. Separator 106 comprises, in some embodiments, pores 108 in which electrolyte can reside. As shown illustratively in FIG. 1A, separator 106 can comprise, in certain embodiments, regions 110 proximate first electrode 102 in which pores 108 are substantially filled with an ion conductor 112. No such filling is shown in the pores of the separator of FIG. 1B.

Ion conductor 112 can inhibit interaction of electrolyte with the electroactive material within electrode 102. In certain embodiments, ion conductor 112 substantially prevents interaction of electrolyte with the electroactive material within electrode 102. In some embodiments, inhibiting or preventing the interaction of electrolyte with the electroactive material within electrode 102 can reduce or eliminate the degree to which electrode 102 is degraded or otherwise rendered inoperable by the electrolyte. Thus, in this fashion, ion conductor 112 can function as a protective structure within the electrochemical cell.

In certain embodiments, the arrangement of ion conductor 112 and separator 106 may provide one or more advantages over prior electrode protective structures. For example, the presence of a plurality of ion conductor structures may provide a plurality of ionic pathways from one side of the protective structure to the other (i.e., between the protected electrode and the electrolyte). While ceramic cells or layers may include pinholes, cracks, and/or grain boundary defects that can propagate throughout the entire cell or layer, the presence of a plurality of ionic pathways can reduce the impact of a defect in any one ionic pathway. In addition, the positioning of ion conductors within a polymer matrix (e.g., a separator) can decrease the susceptibility of the ion conductors to cracking and other failure mechanisms. The presence of the polymer matrix can provide flexibility and strength, allowing the composite structure to be more flexible and robust than, for example, a continuous ceramic layer. In addition, because a plurality of ionic pathways through the protective structures are present, it is not required that the separator be ionically conductive, which can widen the pool from which separator materials may be selected.

The ion conductor and the separator may be arranged, in certain embodiments, such that the ion conductor extends into the pores of the separator. In some embodiments, the ion conductor extends, on average, at least about 5%, at least about 10%, at least about 25%, at least about 50%, or at least about 80% (and/or, in certain embodiments, up to about 90% and/or up to substantially 100%) through the pores of the separator from the side of the separator facing the first electrode, toward the second electrode. Referring to FIG. 1A, for example, ion conductor 112 extends about 50% through the pores of separator 106 from the side of separator 106 facing first electrode 102 toward second electrode 104. In some embodiments, the ion conductor extends, on average, at least about 0.1 microns, at least about 1 micron, or at least about 2 microns (and/or, in certain embodiments, up to about 10 microns, or more) through the pores of the separator from the side of the separator facing the first electrode, toward the second electrode.

In certain embodiments, ion conductor material 112 can comprise a plurality of protrusions extending into separator 106. In some such embodiments, the protrusions can be discrete. In some embodiments, the protrusions can be connected via an ion conductor material that can be the same as or different from the ion conductor material from which the ion conducting protrusions are formed. For example, referring to FIG. 1A, the protrusions of ion conductor material 112 are all connected to a base layer of ion conducting material which is the same as the ion conductor materials used to form the protrusions. In other embodiments, the protrusions of the ion conductor material are connected to a base layer of ion conducting material which is different from the ion conductor materials used to form the protrusions. In yet other embodiments, no such base layer is present and the protrusions are physically isolated from one another.

Protrusions of ion conducting material may be spatially arranged in any suitable manner. In some embodiments, the protrusions of ion conducting material can be spatially disordered. For example, in FIG. 1A, the lateral distances between the protrusions of ion conductor material 112 vary substantially from protrusion to protrusion.

In certain embodiments, the average cross-sectional dimensions of the protrusions of ion conductor material are dissimilar. For example, in FIG. 2, each of the protrusions of ion conductor material 112 in structure 120 are of different sizes and shapes, leading to a substantially random spatial distribution of ion conductor material.

In some embodiments, ion conductor 112 can be arranged within the pores of separator 106 by depositing or otherwise forming ion conductor 112 over separator 106 such that ion conductor material at least partially fills the pores of the separator. While pores 108 in FIGS. 1A and 1B are substantially straight, in other embodiments, pores 108 may be tortuous. In some such embodiments, the shadowing and twisted nature of the pores within the separator can determine how far into the pores the ion conductor deposition vapor will travel before it contacts a wall and condenses. In some such embodiments, there will be deeper penetration of some vapor, but at a certain point it will grow fast enough to fill the hole, and the partially coated walls deeper than the filled point remain unfilled.

In other embodiments, ion conductor 112 can be arranged within the pores of separator 106 by removing a portion of ion conductor material from a layer of ion conductor material to leave behind protrusions and subsequently forming separator material over the ion conductor material.

It should be appreciated that while FIGS. 1A and 1B show an electrochemical cell, in some embodiments not all components shown in the figure need be present. For instance, the articles and methods described herein may encompass only components of electrochemical cells (e.g., a separator and an ion conductor without one of an anode and/or cathode). It should also be appreciated that other components that are not shown in FIGS. 1A and 1B may be included in electrochemical cells in some embodiments. As one example, an ion conductor layer (e.g., an inorganic layer ion conductor layer) may be a part of a multi-layered structure comprising more than one ion conductor layers. At least two layers (e.g., two ion conductor layers) of the multi-layered structure may be formed of different materials, or the same material. In some cases, at least one of the layers of the multi-layered structure may comprise a lithium oxysulfide material, as described in more detail below. Other configurations are also possible.

An example of a system comprising a protective structure (e.g., protected lithium anode (PLA)) with a structure (e.g., a disordered structure) comprising ionically-conductive materials (e.g., a ceramic vias) surrounded by a separator layer (e.g., a polymer matrix layer) is provided below. It should be understood that, everywhere in which lithium is described as an electroactive material, other suitable electroactive materials (including others described elsewhere herein) could be substituted. In addition, everywhere in which a ceramic is described as the ion conductor, other ion conductor materials (including others described elsewhere herein) could be used.

As described herein, previous systems have employed layers of ceramic or other materials (e.g., alternating continuous layers of ceramic and polymer) to protect lithium anodes from adverse interaction with electrolyte material during operation of electrochemical cells. Certain structures having this configuration may be problematic if the ceramic layer(s) is brittle. To have the ceramic layer function properly as a protective structure, it should generally remain intact with little or no cracks or defects. Breaks in the continuity of the ceramic layer can allow electrolyte to penetrate, which can create a localized high current path through the ceramic layer. This path can lead to an eventual breakdown in the layers effectiveness as a protector to the lithium metal underneath. Another problem can arise if the electrolyte reaches the polymer layer and causes it to swell. Such swelling can be relatively large (e.g., several hundred percent, in some cases). Swelling of the polymer can cause the ceramic layer(s) on either side of the polymer to crack, which can, in turn, allow the electrolyte to further penetrate the protective structure. In certain cases, a cascade effect can be observed as the next polymer layer is exposed to the electrolyte and swells. This further breaks the ceramic layers until all layers are compromised and protection of the lithium is compromised.

One way to address the problems discussed above is to develop materials and/or structures that do not substantially swell or break. This can be challenging, however. For example, many known polymers, which are ionically conductive, swell considerably in various electrochemical cell electrolytes. Also, it can be difficult to process ceramic materials such that they do not contain defects, and handling of such materials without introducing defects (e.g., cracks) is difficult.

An alternative involves using a structure which allows the use of non-ionically conductive polymers (which are often flexible but have low swelling in many electrolytes) in combination with a segmented ion conductor (e.g., a ceramic) that inhibits electrolyte interaction with the electrode. Using a segmented ion conductor can increase the likelihood that a crack or defect is contained within a small portion of the total protective structure. This way, when cracks or other defects are formed, only a small section of the protective structure is lost, instead of the entire layer. These segments can also allow movement relative to each other without cracking the whole layer.

Thus the proposed structure change, incorporating these elements described above, is to build a matrix of ionically conductive ceramic "posts" or "vias" which provide protection for the lithium, yet allow the ions to pass through. This array of vias can be tied together by a polymer matrix (e.g., a non-ionically conductive polymer matrix), which can allow for mechanical flexibility while inhibiting (or eliminating) the amount of swelling upon exposure to the electrolyte. As described herein, in some embodiments a polymer matrix or polymer layer may be in the form of a separator (e.g., a commercially-available separator).

Figure 2:
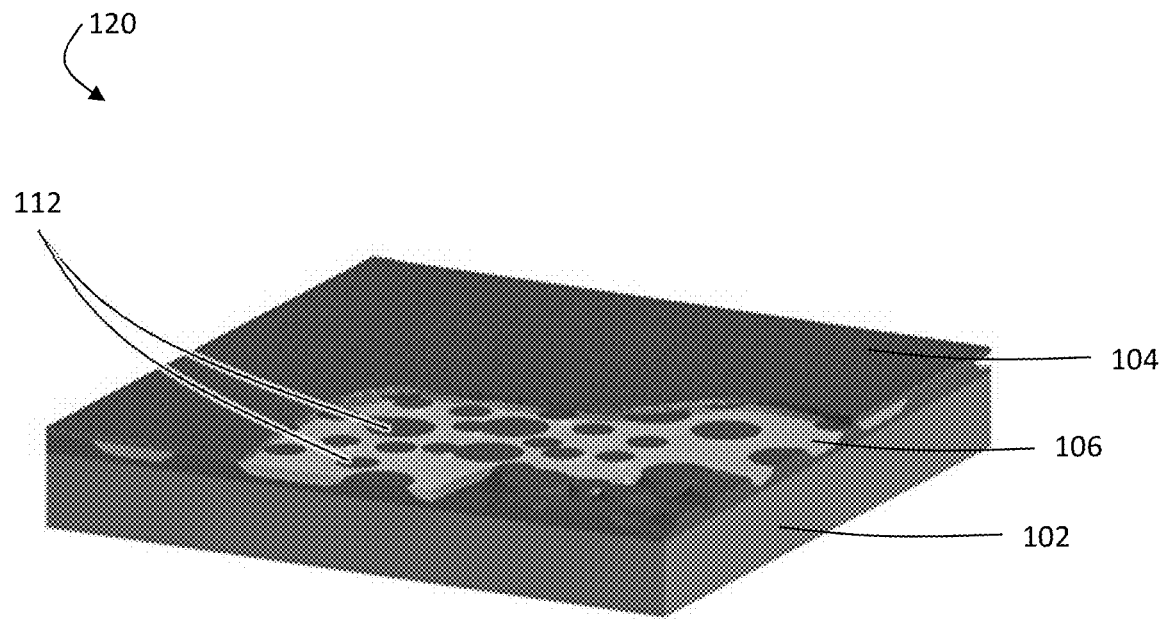
FIG. 2 is an exemplary schematic illustration of, according to certain embodiments, an example of a disordered structure.

The embodiment in FIG. 2 shows structure 120 with an electroactive material 102 (e.g., lithium), a polymer layer 106 (e.g., a separator), and an electrode 104, in which ion conductor 112 (e.g., a ceramic) is deposited in a disordered, porous or columnar form by the deposition process. The areas in between can then be filled with polymer to form the disordered protective structure.

There are different approaches that are possible for the construction of a protective structure such as a disordered structure PLA. The first process approach involves depositing the ceramic before the polymer is filled in. This can be done in two configurations. In one configuration, an electroactive material (e.g., lithium) is deposited on a substrate containing a release layer and a current collector followed by the protective structure (e.g., PLA construction) on top. This can then be released from the carrier substrate. In the second method, the anode is built upside down, with the protective structure being deposited on a release layer attached to a carrier substrate. The electroactive material is then deposited last and the entire structure is released. In an another method, a release layer is not required and a protective structure can be formed directly on a substrate (e.g., a separator or other matrix, such as a polymer matrix) to be included in an electrochemical cell. For instance, instead of using a carrier substrate in the second method, the protective structure may be deposited on a separator, followed by depositing lithium on the protective structure.

Figure 3:
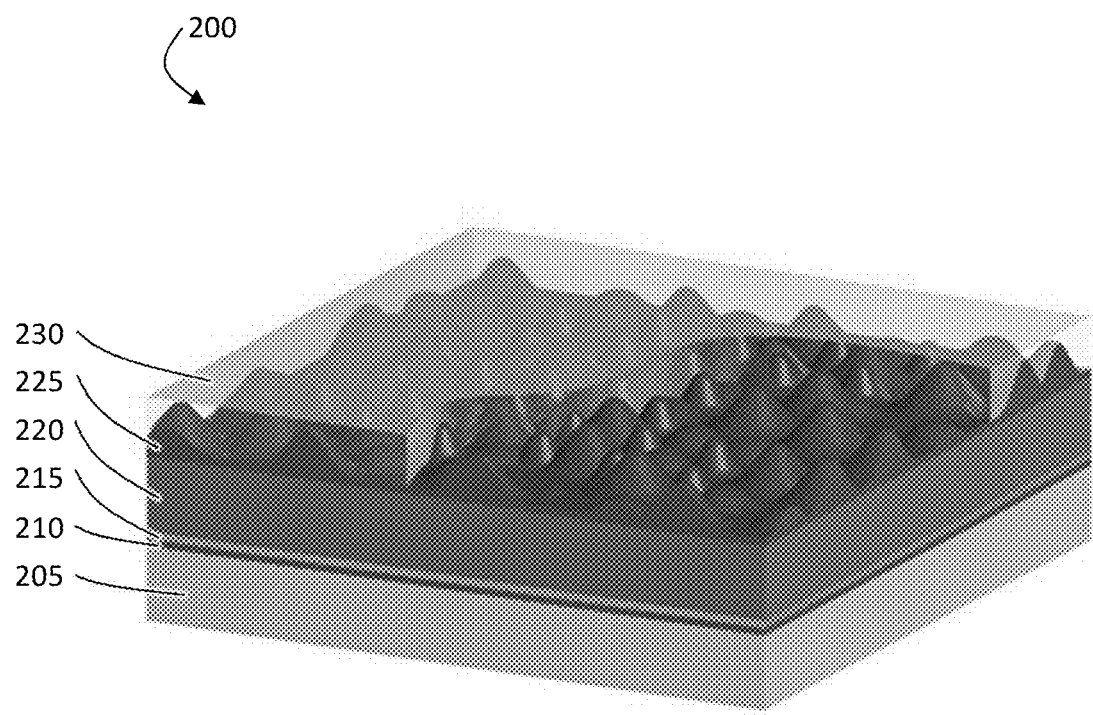
FIG. 3 is an exemplary schematic illustration of, according to some embodiments, a protective structure in which a polymer layer (e.g., a polymer coating, top layer) is deposited over an ion conductor (e.g., a ceramic, under the separator layer).

The steps to build a configuration in which the ion conductor (e.g., ceramic) is deposited before deposition of a polymer can be performed as follows. As shown in structure 200 in FIG. 3, one can begin with a carrier substrate 205 that has been coated with a release layer 210. The release layer can then be metalized with a current collector 215 (e.g., a copper current collector). In some embodiments, a layer of an electroactive material 220 (e.g., 25 µm thick lithium) can also be deposited on top of the current collector, before the addition of an ion conductor material 225 (e.g., a ceramic). The next step comprises using a plasma system to convert or to deposit while converting with the plasma, a layer of porous or columnar type ion conductor (e.g., 1-2 µm in thickness). The final deposited layer can correspond to a polymer layer 230 (e.g., a non-swellable, non-conductive polymer layer), which can fill at least a portion of (or all of) the area between the ion conductor material columns. This polymer can also completely coat the top structure as shown in FIG. 3.

Figure 4:
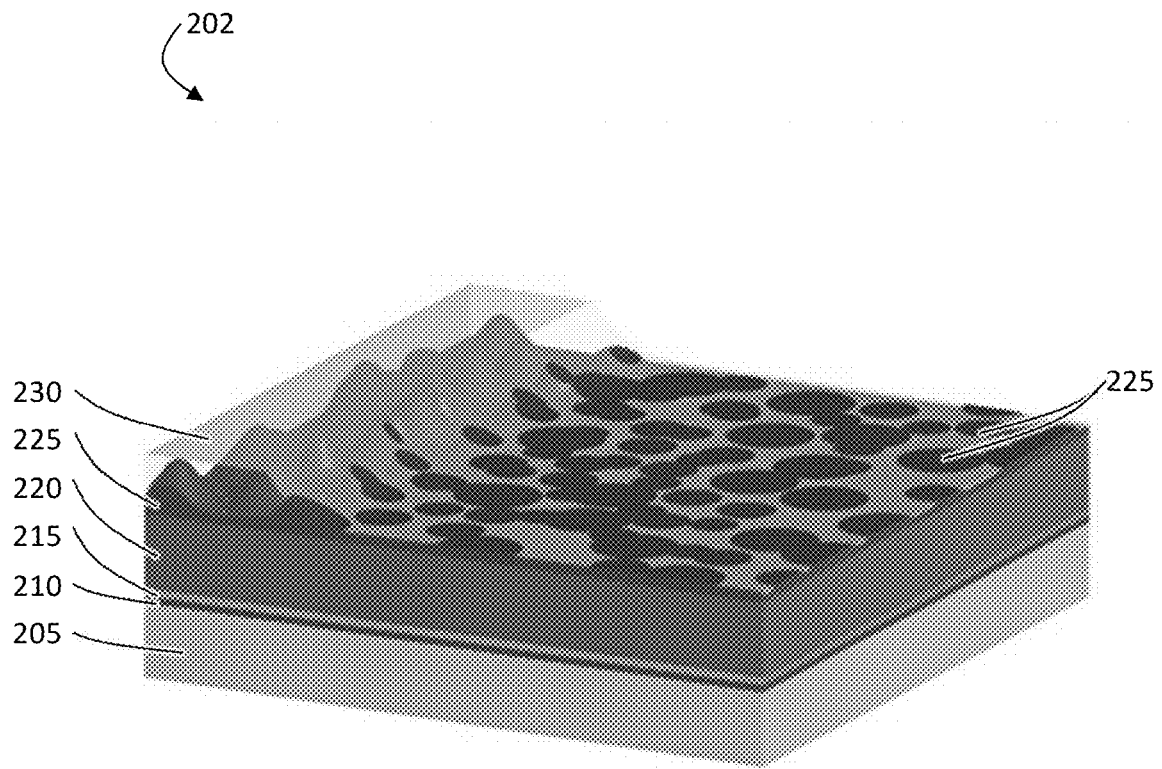
FIG. 4 is an exemplary schematic illustration of, according to some embodiments, a cut-away of the protective structure shown in FIG. 3, showing a portion of the structure after plasma etching has exposed the raised portions of the ion conductor layers.

For many applications, the polymer-coated structure is not useable in its present form, as the polymer blocks conductivity. To correct this, this entire structure can be placed in front of a plasma etch station to remove the top layer of polymer and ceramic to expose the vias below. This is illustrated in the structure 202 in FIG. 4. In certain embodiments, the entire structure is released from the carrier substrate. The release layer may be released along with the carrier in some embodiments, but may remain attached to the current collector in certain instances. In such embodiments, the release layer can be penetrated easily to attach leads to the current collector. As shown in FIG. 4, the top (which can be configured to be exposed to the electrolyte) has only the tops of the vias as conductors for the current (the discontinuous areas). However the side toward the electroactive material includes a single uniform ion conductor layer 225 that distributes the current evenly across the electroactive material. This can be desirable, in certain cases, so that during discharge and charge, the stripping and re-plating of the electroactive material is uniform. This layer can crack unlike the multilayer, continuous structure, because as long as it is connected to a via, the entire section will still function.

Figure 5:
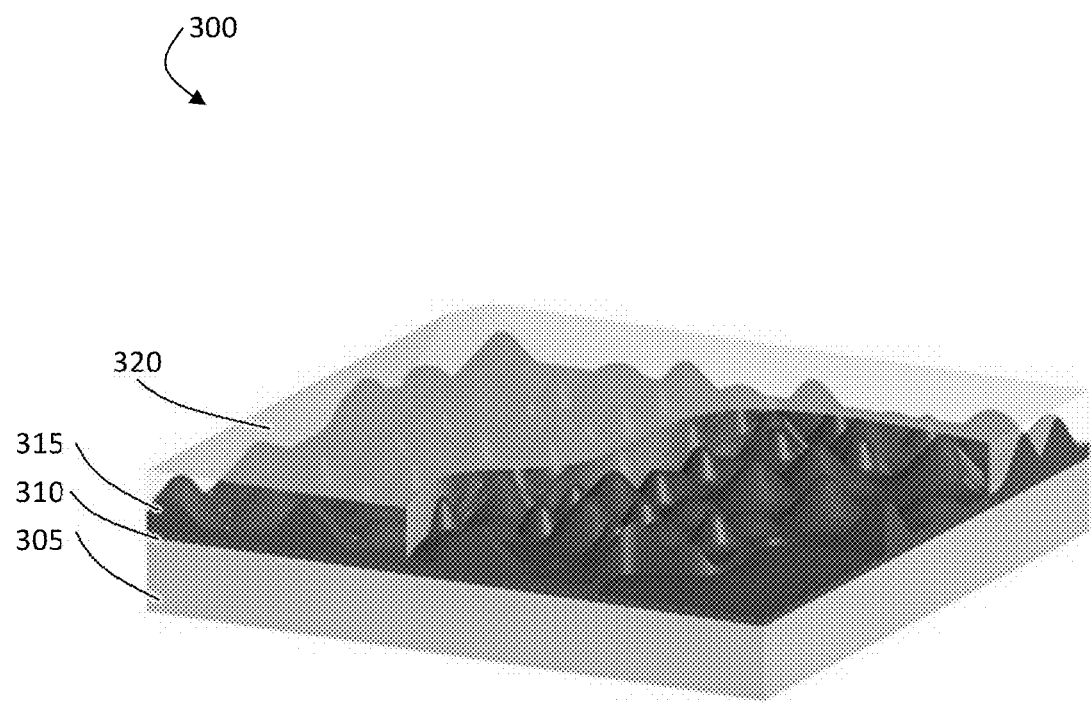
FIG. 5 is an exemplary schematic illustration of, according to some embodiments, a cut-away of a processed protective structure showing an ion conducting layer (e.g., ceramic layer) encased in a non-conductive, polymer coating, deposited on a structure comprising a release layer coated on a carrier substrate
Figure 6:
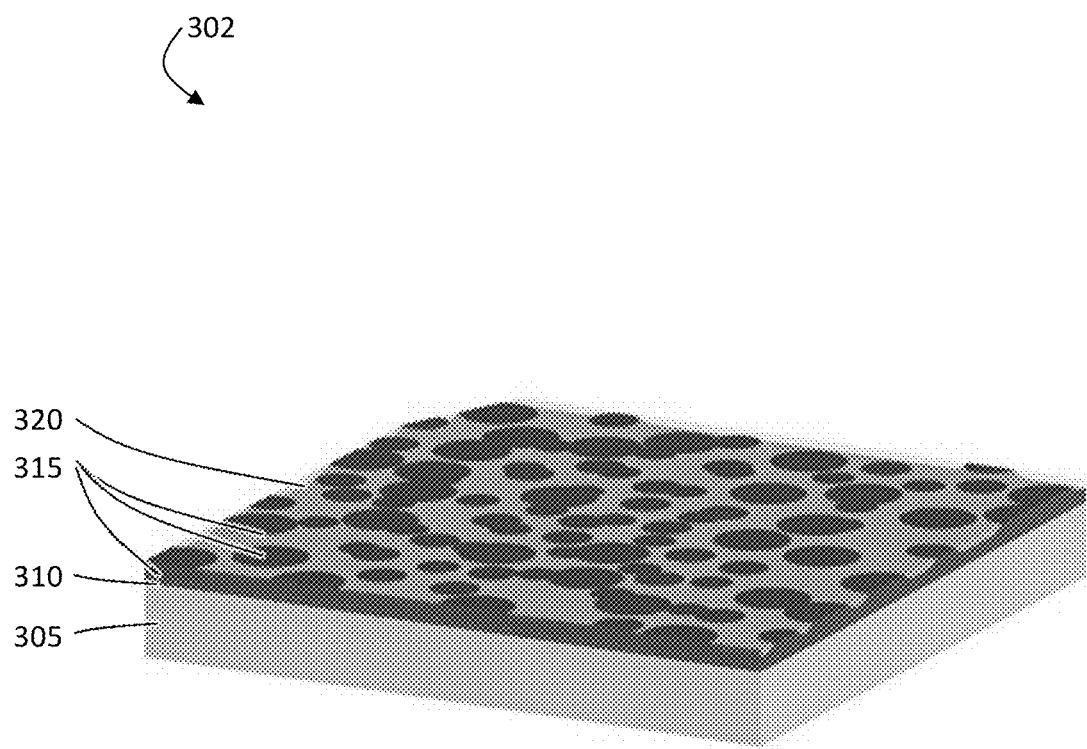
FIG. 6 is an exemplary schematic illustration of, according to some embodiments, of a cut-away of the protective structure after plasma etching to expose the raised portions of the ion conducting layer (e.g., a ceramic layer).
Figure 7:
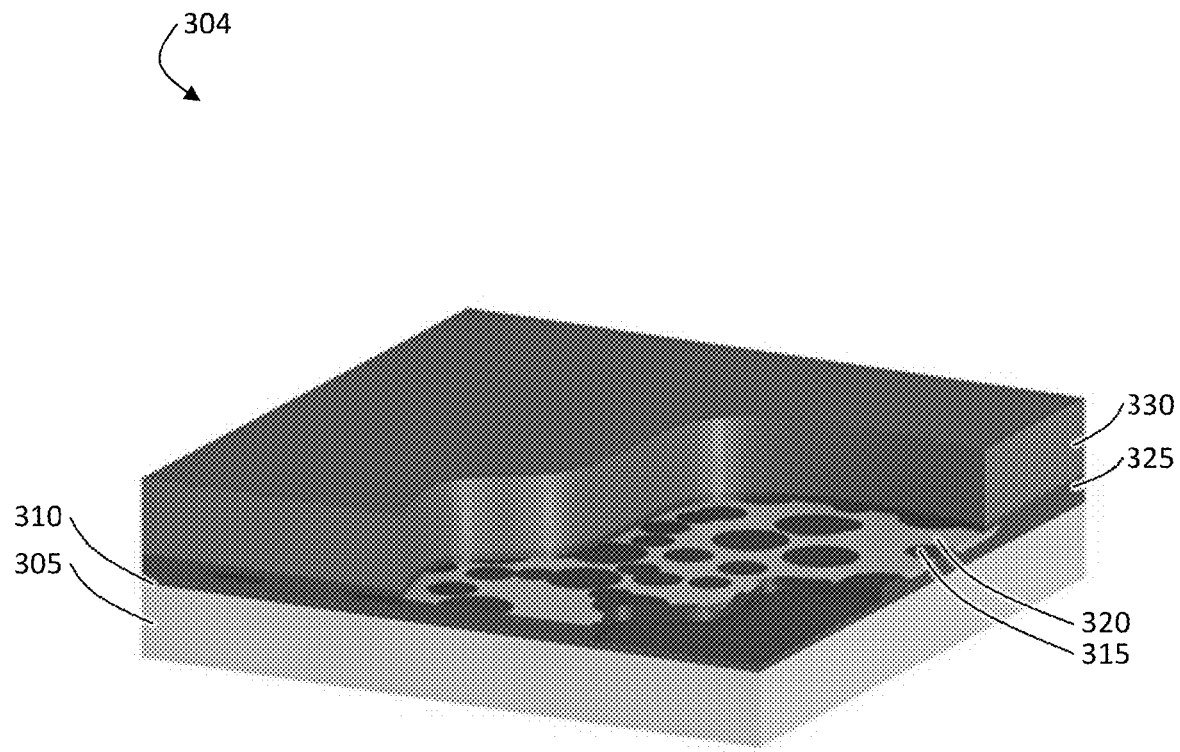
FIG. 7 is an exemplary schematic illustration of, according to some embodiments, showing an electroactive material and a current distribution layer deposited on the protective structure.

The steps to build a configuration in which a protective structure is deposited on a release layer attached to a carrier substrate can be performed as follows, as shown illustratively in FIG. 5. In this configuration, a structure 300 is built upside down by depositing onto a carrier substrate 305, a release layer 310, an ion conductor layer 315 (e.g., a ceramic), followed by a polymer 320, followed by a lithium layer, then releasing the entire structure. The build starts with the carrier substrate that is coated with the release layer. A porous or columnar ion conductor layer (e.g., a ceramic) can be deposited on top of the release layer (e.g., by physical vapor deposition techniques) and, in some cases, modified with a plasma or ion source. The porous or columnar ion conductor layer can then be coated with a flexible non-conductive, non-swellable polymer as shown in FIG. 5. As in the first configuration, a completely coated structure can be plasma etched to expose the ceramic vias in the polymer matrix (FIG. 6, structure 302). As was described in the first configuration, a continuous ion conductor layer 325 (FIG. 7) can be optionally added on top of structure 302 of FIG. 6, followed by a current collector (e.g., not shown in figure) and/or an electroactive material layer 330, resulting in structure 304.

The additional ion conductor layer (also referred to herein as a current distribution layer (CDL)) can be configured to serve one or more of several functions. First, the CDL can be configured to provide an interface for the vacuum deposited electroactive material (e.g., lithium). Second, the CDL can be configured such that it tends to spread the electroactive material ion current evenly across its surface. This can eliminate non-uniformities in the current during discharge and charge where the electroactive material is stripped and re-plated. In certain cases in which the CDL is not included, the electroactive material might re-plate only around the vias leaving voids in the areas with no ceramic. Lastly, the CDL may be made with a different material to act as a buffer to overcome any interfacial impedances between the ion conductor material and the electroactive material layer. As was also observed before, the CDL can crack but still be effective as long as it is still in contact with a via.

In some embodiments, the carrier substrate can be removed from the protective structure. The release layer can remain with the substrate or be attached to the ion conductor layer deposited onto the polymer. In some cases, the completed structure can be removed from the carrier substrate. In certain embodiments, the release can be configured to dissolve in the electrolyte. In some such embodiments, the release can be configured to dissolve in the electrolyte without harming the cell.

Another approach to creating a protective structure (e.g., a disordered PLA structure or other structure) is to start with a porous polymer structure (e.g., a separator) and following with a deposition of an ion conductor material, such as a ceramic. The deposition of ion conductive material may fill at least a portion of the pores of the porous polymer structure in some embodiments, as shown previously in FIG. 1A. However, as described in more detail herein, in some cases the pores of the polymer structure are substantially unfilled with a solid ion conductor material (e.g., an inorganic ion conductor material), as shown illustratively in FIG. 1B. In some such embodiments, the pores of the separator may be filled with a liquid (e.g., an ion conducting electrolyte solvent) in an electrochemical cell.

In certain processes involving starting with a porous polymer structure (e.g., a separator) and then depositing an ion conductor material on top of the polymer structure (regardless of whether or not the pores of the polymer structure are filled or unfilled with the ion conductor), it may be desirable to use a porous polymer structure having a smooth surface (i.e., a surface having a low root mean square (RMS) surface roughness). As the smoothness of the layer(s) formed on top of an underlying layer may depend on the smoothness of the underlying layer, the subsequent formation of a protective structure on top of a rough layer may result in the protective structure having rough surfaces. In some cases, rough surfaces of the protective structure can lead to defects that allow an electrolyte or a component of the electrolyte to pass across it during use of the electrochemical cell, and may result in a reaction between the electrolyte and/or a component of the electrolyte with an electroactive layer which the protective layer seeks to protect.

In certain existing methods involving forming a protective layer on top of an electroactive layer, defects may also be formed in the protective structure since the deposition of the layer(s) of the structure may involve conditions (e.g., temperature, pressure, and formation rate) that are favorable towards the electroactive layer (e.g., a low temperature so as to not cause melting or deformation of the electroactive layer), but less favorable towards the formation of defect-free structures. Additionally, it may be difficult to form a smooth electroactive layer surface on which to deposit the protective structure in some embodiments. Defects in the protective layer(s) can be minimized, in some embodiments, by forming a protective structure on a smooth surface of a separator, as described herein. The ability to produce smooth protective layer(s) may also reduce the thickness requirements of the protective layer(s) (while maintaining the protective layer(s)' function) to impede electrolyte), leading to an electrochemical cell having a higher specific energy compared to a similar cell but having thicker protective layer(s).

An exemplary description of a process which starts with coating a porous polymer structure (e.g., a separator) is now provided.

Figure 8:
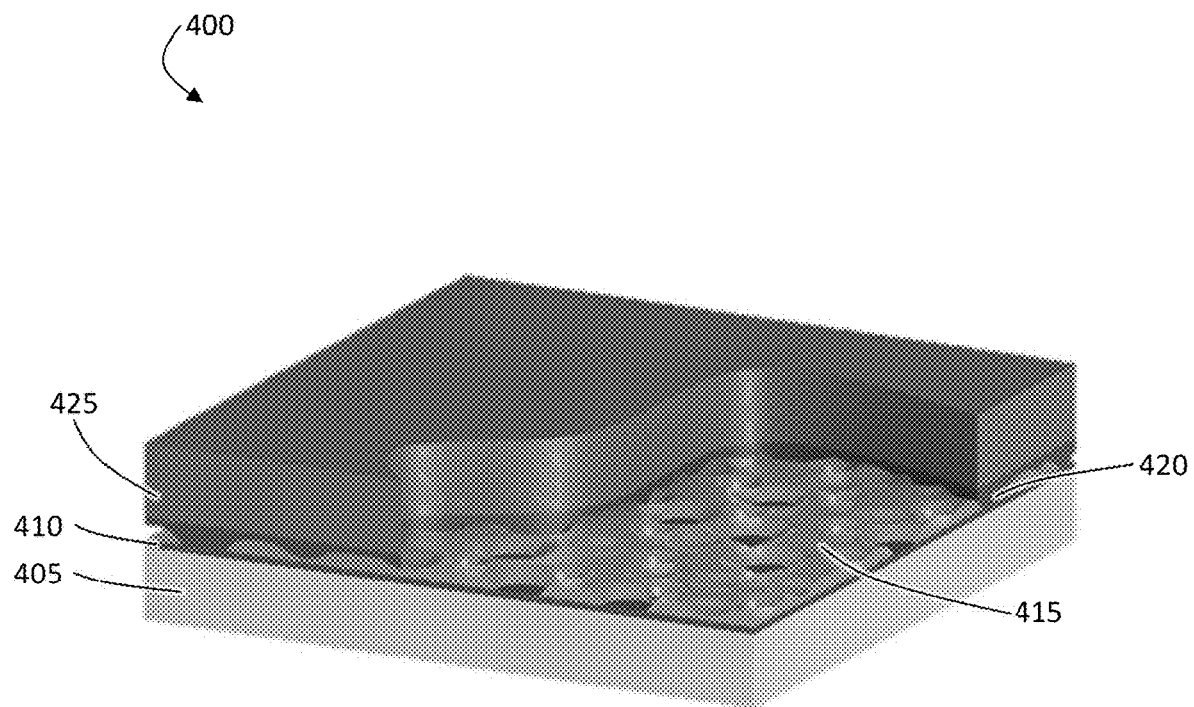
FIG. 8 is an exemplary schematic illustration of, according to some embodiments, of a cut-away of a disordered protective structure showing the various layers before de-lamination of the carrier substrate.

In one set of embodiments, the fabrication of structure 400 can be started on a carrier substrate 405 which optionally has release coating 410 on top, as shown illustratively in FIG. 8. Next, a porous polymer coating 415 can be positioned over the release layer. This type of porous polymer deposition can naturally result from depositing and curing certain polymers and/or it could be forced by introducing additives to the material and/or by disturbing the deposition with plasma or ion beam treatment. In certain embodiments, the holes are configured such that they are completely through the polymer. In yet other embodiment, commercially-available polymer layers may be used (e.g., commercially-available separators). Moreover, in certain embodiments, no carrier substrate and/or no release layer is needed, as described in more detail below.

Next, an ion conductor layer 420 such as a ceramic layer can be deposited over the polymer. For example, vacuum techniques (such as e-beam evaporation, thermal evaporation, or sputtering) may be used to deposit the ion conductor (e.g., ceramic). In some embodiments, ion conductor (e.g., ceramic) may be deposited by drawing a ceramic slurry into the pores and solidifying (e.g., curing). In certain embodiments, the coating is deposited such that the holes or voids in the polymer coating are filled in with the ion conductor (e.g., ceramic); however, in other embodiments the holes or voids in the polymer coating are not substantially filled. In some embodiments, a substantially continuous layer of ion conductor (e.g., ceramic) is formed over the polymer layer. One may create an ion conductor sheet (e.g., a ceramic sheet) even after the holes have been filled for a number of reasons. For example, the sheet can create a layer upon which the lithium will be deposited. As another example, the sheet can act to distribute the ionic current across the ion conductor (e.g., ceramic) vias which penetrate the porous polymer layer. In certain embodiments, it is acceptable for the sheet to break (while still retaining adequate performance in the electrochemical cell) as long as the sections remain in contact with the vias. The ionically conductive channels (e.g., a ceramic, the circular structures connected to the continuous underlying layer) can be seen extending through the flexible, non-conducting polymer layer.

In certain embodiments, the final deposition step is to coat the ion conductor (e.g., ASL) with an electroactive material 425 (e.g., 25 μm of lithium, or other amounts as described herein). The finished structure can then be separated from the carrier substrate, in some embodiments, due to the presence of a release layer. The release layer may release with the stack, but a layer could be used that releases from the polymer, so that the release layer remains with the carrier. This process does not require plasma etching. Since plasma etching can be time consuming, elimination of such steps can be preferred to save time.

Figure 9:
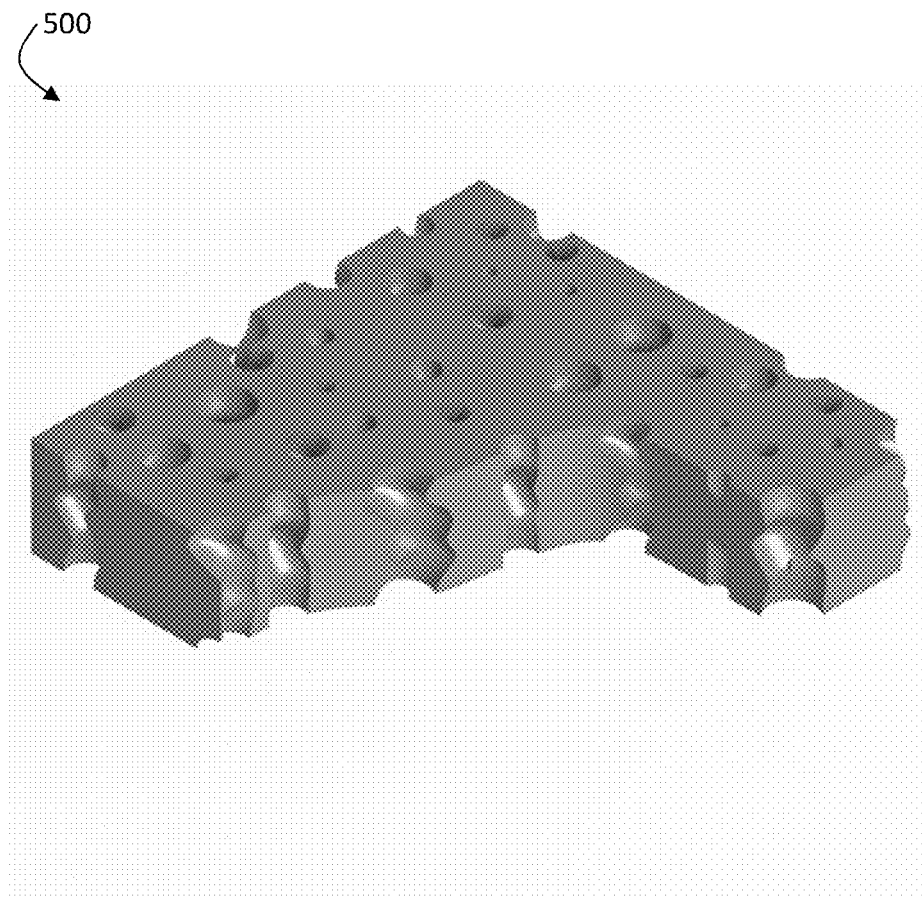
FIG. 9 is an exemplary schematic illustration of, according to some embodiments, of a free-standing separator film comprising tortuous hole paths.

One variant of the above is to use a free-standing, porous, polymer layer as the polymer matrix (e.g., a free-standing separator). In some such cases, no release coating or carrier substrate is required. According to one exemplary fabrication process, a porous, polymer layer 500 is provided, as illustrated in FIG. 9. The porous polymer layer may be conductive or non-conductive to ions. One example of a suitable film is a commercially available porous, polymer layer, such as those used in battery separators (and including those described elsewhere herein). This film can be used as an as-cast polymer matrix. The hole pathways through the film can be quite tortuous in some embodiments. In certain embodiments, the hole pathways through the film pass completely through the film. This free standing film can then be coated with an ion conductor (e.g., a ceramic).

The approach of coating a free-standing polymer layer (e.g., a separator) with an ion conductor material offers a number of advantages over method of fabricating other protective structures. First among these is the fact that the resulting structure does not have to be released from a carrier substrate. This not only results in a cost savings and a reduction of materials, but it avoids the possibility of damaging the fragile ion conductor coating during the release step. Second, binding the ion conductor material to the surface of the separator creates a mechanically stable platform for the thin ion conductor (e.g., ceramic) coatings, greatly enhancing the coating's ability to withstand the mechanical stresses encountered when it is placed in a pressurized cell against a rough cathode. Third, such a process can be accomplished in a single chamber pump down. Not having to open the vacuum chamber during the deposition process reduces the chances for contamination as well as minimizes the handling of the material.

Figure 10A:
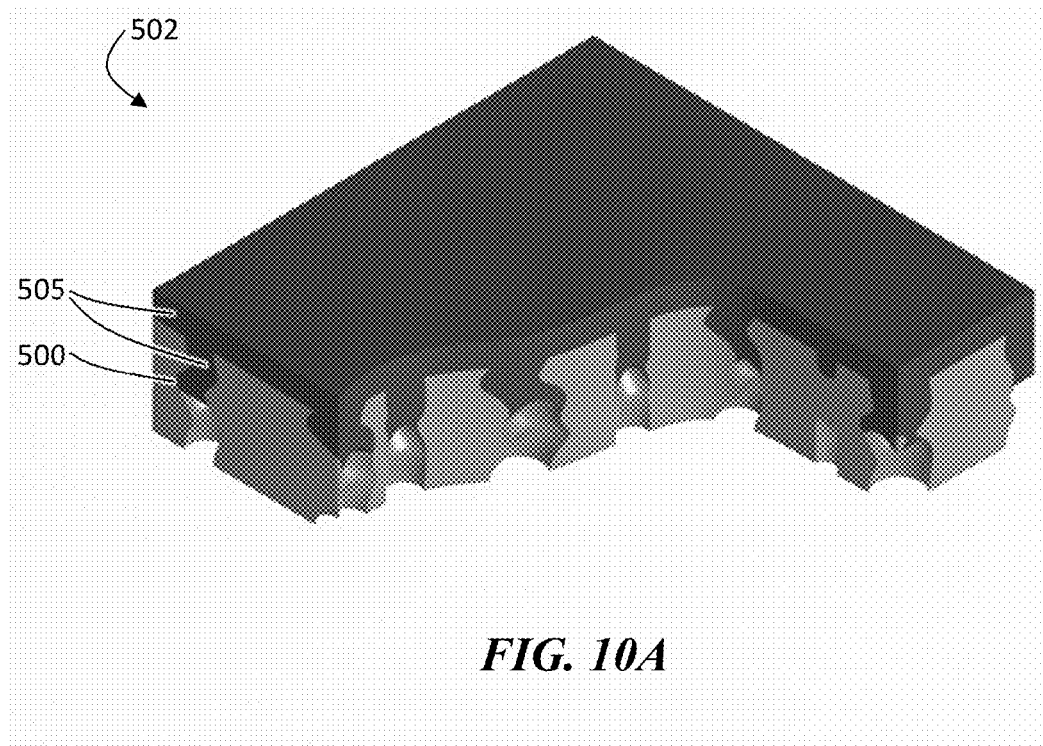
FIG. 10A is an exemplary schematic illustration of, according to some embodiments, of a porous separator coated with an ion conductor layer and having partially filled pores.
Figure 10B:
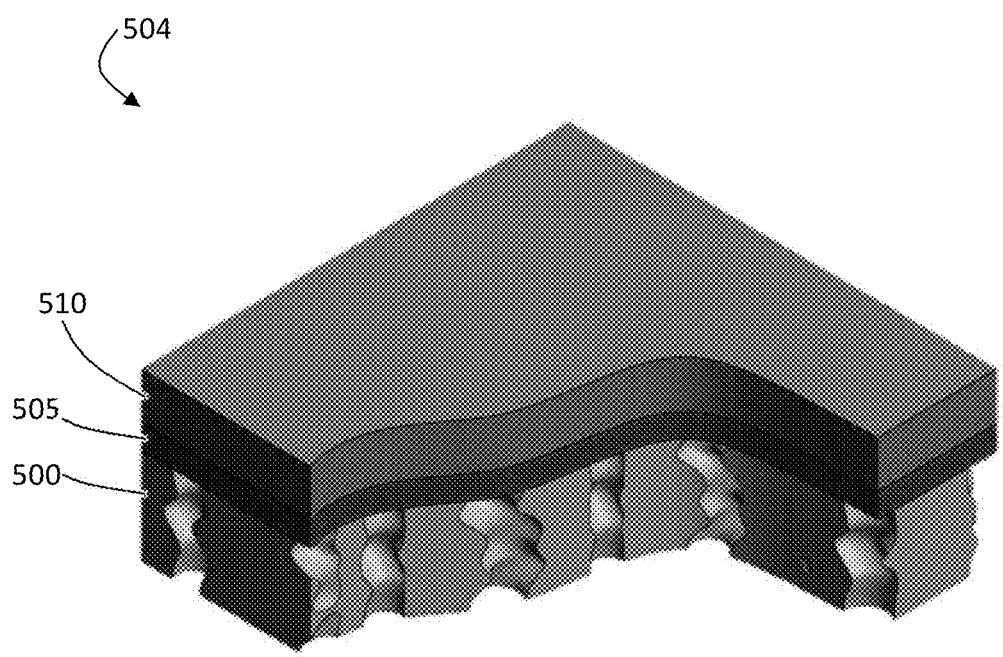
FIG. 10B is an exemplary schematic illustration of, according to some embodiments, of a porous polymer coated with an ion conductor layer showing a current distribution layer on top and having unfilled pores.

As described herein, in some embodiments an ion conductor material can be deposited onto a polymer layer, such as a separator, using a vacuum deposition process (e.g., sputtering, CVD, thermal or E-beam evaporation). Vacuum deposition can permit the deposition of smooth, dense, and homogenous thin layers. In some embodiments it is desirable to deposit thin layers of an inorganic ion conductor material since thick layers can increase the internal resistance of the battery, lowering the battery rate capability and energy density. As shown illustratively in structure 502 in FIG. 10A, the pores of a polymer layer 500 (e.g., a separator) can be partially filled with an ion conductor 505 (e.g., ceramic), which may be conductive to ions of an electroactive material (e.g., lithium). However, in other embodiments, the pores of the polymer layer are substantially unfilled with the ion conductor, as illustrated in FIG. 10B. In embodiments in which all or portions of the pores of the polymer layer are not filled with an inorganic ion conductor (e.g., a ceramic), those portions may be filled with an electrolyte solvent when positioned in an electrochemical cell. In some embodiments, the ion conductor may be coated with a final layer of an electroactive material 510 (e.g., lithium).

The ion conductor layer may be continuous in some embodiments, or discontinuous in other embodiments. In embodiments in which the pores of the polymer layer are at least partially filled with ion conductor, the ion conductor layer can flex and crack with no harm done to the structure's functionality as long as the broken sections are still attached to the vias. In embodiments in which the pores of the polymer layer are substantially unfilled with ion conductor, the ion conductor layer can still function in the presence of cracks as long as the unfilled side of the pores are in the electrolyte (e.g., electrolyte solvent). In some such embodiments, the connection of the ionic conductor to the electrolyte will allow the cell to function.

To form an electrode, an electroactive material such as lithium may be deposited on the polymer layer-ion conductor composite. In FIG. 10A, the final form of the protective structure is illustrated with lithium deposited on the ion conductor-coated polymer layer with partially filled pores. In FIG. 10B, the final form of the protective structure is illustrated with lithium deposited on the ceramic coated polymer layer with no pore filling. The lithium can be configured to adhere to the ion conductive layer, as described in more detail below. In certain embodiments of this process, there is no etching involved, which can make the process very fast and efficient.

It should also be appreciated that although several figures shown herein illustrate a single ion conductor layer, in some embodiments a protective structure includes multiple ion conductor layers (e.g., at least 2, 3, 4, 5, or 6 ion conductor layers) to form a multi-layered structure. As one example, an ion conductor layer (e.g., an inorganic layer ion conductor layer) may be a part of a multi-layered structure comprising more than one ion conductor layers, wherein at least two layers (e.g., two ion conductor layers) of the multi-layered structure are formed of different materials. In other instances, at least two layers of the multi-layered structure (e.g., two ion conductor layers) are formed of the same material. In some cases, at least one of the layers of the multi-layered structure may comprise a lithium oxysulfide material. The multi-layered structure may optionally include polymer layers (e.g., at least 1, 2, 3, 4, 5, or 6 polymer layers). In some embodiments, the polymer layers are interspersed between two or more ion conductor layers. Each of the layers of the multi-layered structure may independently have features (e.g., thickness, conductivity, bulk electronic resistivity) described generally herein for the ion conductor layer and/or polymer layer.

In structures involving a single ion conductor layer, the ion conductor layer (which may comprise a lithium oxysulfide in some embodiments) may be in direct contact with each an electroactive material of a first electrode and the separator/polymer layer.

As described herein, in some embodiments involving the formation of a protective structure by disposing an ion conductor on the surface of a polymer layer (e.g., a separator), such as in some of the embodiments described with respect to FIGS. 1-11, it is desirable to increase the bonding or adhesive strength between the ion conductor and the polymer layer. As a result of increased adhesion between the layers, the likelihood of delamination of the layers can be reduced and the mechanical stability of the ion conductor layer can be improved during cycling of the cell. For example, the resulting ion conductor layer-polymer composite can enhance the ion conductor layer's ability to withstand the mechanical stresses encountered when it is placed in a pressurized cell against a rough cathode. Accordingly, in some embodiments, prior to deposition of the ion conductor layer, the surface of the polymer layer (e.g., separator) may be treated (e.g., in a pre-treatment process) to enhance the surface energy of the polymer layer. The increased surface energy of the polymer layer (e.g., separator) can allow improved adhesion between the ion conductor layer and the separator compared to when the surface of the separator is not treated.

In certain embodiments, adhesion is enhanced when a ratio of the thickness of the ion conductor layer to the average pore diameter of the polymer layer (e.g., separator) is present in certain ranges, as described in more detail below.

To increase the surface energy of the polymer layer (i.e., activate the surface of the polymer layer), a variety of methods may be used. The method may involve, for example, a pre-treatment step in which the surface of the polymer layer (e.g., separator) is treated prior to deposition of an ion conductor material. In certain embodiments, activation or a pre-treatment step involves subjecting the polymer layer (e.g., separator) to a source of plasma. For example, an anode layer ion source (ALS) may be used to generate a plasma. In general, an anode layer ion source involves generating electrons by an applied potential in the presence of a working gas. The resulting plasma generated creates additional ions and electrons, which accelerate towards the target substrate (e.g., the polymer layer), providing ion bombardment of a substrate. This bombardment of the polymer layer substrate increases the surface energy of the polymer layer and promotes adhesion between the separator and the ion conductor material to follow.

Various working gases can be used during a surface activation process such as plasma treatment. In general, surface activation may occur in the presence of one or more gases including: air, oxygen, ozone, carbon dioxide, carbonyl sulfide, sulfur dioxide, nitrous oxide, nitric oxide, nitrogen dioxide, nitrogen, ammonia, hydrogen, freons (e.g., $CF_4$, $CF_2Cl_2$, $CF_3Cl$), silanes (e.g., $SiH_4$, $SiH_2(CH_3)_2$, $SiH_3CH_3$), and/or argon.

In general, plasma treatment modifies the surface of the polymer layer (e.g., the separator) by ionizing the working gas and/or surface and, in some instances, forming or depositing activated functional chemical groups onto the surface. In certain embodiments, activation of certain functional groups on the surface of the polymer layer may promote binding between the polymer layer and an ion conductor material. In certain embodiments, the activated functional groups may include one or more of the following: carboxylates (e.g., —COOH), thiols (e.g., —SH), alcohols (e.g., —OH), acyls (e.g., —CO), sulfonics and/or sulfonic acids (e.g., —SOOH or —$SO_3H$), amines (e.g., —$NH_2$), nitric oxides (e.g., —NO), nitrogen dioxides (e.g., —$NO_2$), chlorides (e.g., —Cl), haloalkyl groups (e.g., $CF_3$), silanes (e.g., $SiH_3$), and/or organosilanes ($SiH_2CH_3$). Other functional groups are also possible.

In certain embodiments, plasma treatment, such as an ALS process, is performed in a chamber at a pressure ranging between, for example, $10^{-2}$ to $10^{-8}$ Torr. For instance, the pressure may be greater than or equal to $10^{-8}$ Torr, greater than or equal to $10^{-7}$ Torr, greater than or equal to $10^{-6}$ Torr, greater than or equal to $10^{-5}$ Torr, greater than or equal to $10^{-4}$ Torr, or greater than or equal to $10^{-3}$ Torr. The pressure may be less than or equal to $10^{-2}$ Torr, less than or equal to $10^{-3}$ Torr, less than or equal to $10^{-4}$ Torr, less than or equal to $10^{-5}$ Torr, or less than or equal to $10^{-6}$ Torr. Combinations of the above-referenced ranges are also possible.

Plasma treatment may generally be performed with a power of the ion source ranging between, for example, 5 W to 200 W. For instance, the power may be greater than or equal to 5 W, great than or equal to 10 W, greater than or equal to 20 W, greater than or equal to 50 W, greater than or equal to 100 W, or greater than or equal to 200 W. The power may be less than or equal to 200 W, or less than or equal to 100 W, or less than or equal to 50 W, or less than or equal to 20 W, or less than or equal to 5 W. Combinations of the above-referenced power ranges are also possible.

Actual surface energy enhancement is a function of pressure, power, and exposure time, with care taken not to overexpose the material which can lead to thermal damage. For example, the exposure time (i.e., the time for which the polymer layer is subjected to plasma treatment) may be greater than or equal to 1 second, greater than or equal to 10 seconds, greater than or equal to 30 seconds, greater than or equal to 1 minute, greater than or equal to 2 minutes, greater than or equal to 5 minutes, greater than or equal to 10 minutes, greater than or equal to 20 minutes, greater than or equal to 30 minutes, greater than or equal to 1 hour, or greater than or equal to 5 hours. The exposure time may be less than or equal to 10 hours, less than or equal to 1 hour, less than or equal to 30 minutes, less than or equal to 10 minutes, less than or equal to 5 minutes, less than or equal to 1 minute, less than or equal to 10 seconds, or less than or equal to 1 second. Combinations of the above-referenced exposure times are also possible.

It would be appreciable to those skilled in the art that setup conditions can vary depending on the efficiency of the plasma system, the efficiency of the power supply, RF matching issues, gas distribution and selection, distance from target substrate, time of plasma exposure, etc. Thus, various combinations of power at which the plasma source is operated, the operating pressure, gas selection, and the length of time of exposure to the plasma source are possible.

Although plasma treatment is primarily described for increasing the surface energy of a substrate (e.g., a polymer layer such as a separator), other methods for increasing the surface energy of a substrate are also possible. For example, in certain embodiments, flame surface treatment, corona treatment, chemical treatment, surface oxidation, absorption of functional groups to the surface, and/or surface grafting may be used to increase the surface energy of a substrate.

The surface energy of the polymer layer (e.g., separator) can be increased to any suitable value. In some embodiments, the surface energy of the polymer layer (e.g., separator) before treatment may be, for example, between 0 and 50 dynes. For example, the surface energy may be at least 0 dynes, at least 10 dynes, at least 20 dynes, at least 30 dynes, at least 40 dynes, or at least 50 dynes. The surface energy may be less than 50 dynes, less than 40 dynes, less than 30 dynes, less than 20 dynes, or less than 10 dynes. Combinations of the above-referenced ranges are also possible.

In some embodiments, the surface energy of the polymer layer (e.g., separator) after treatment may range from, for example, between 30 dynes and 100 dynes (1 dyne=1 g·cm/s$^2$=10$^{-5}$ kg·m/s$^2$=10$^{-5}$ N). In certain embodiments, the surface energy of the polymer layer after treatment may be at least 30 dynes, at least 40 dynes, at least 50 dynes, at least 60 dynes, at least 70 dynes, at least 80 dynes, at least 90 dynes. The surface energy after treatment may be, for example, less than 100 dynes, less than 90 dynes, less than 80 dynes, less than 70 dynes, less than 60 dynes, or less than 50 dynes. Combinations of the above-referenced ranges are also possible. Other surface energies are also possible.

In certain embodiments, the surface energy of a polymer surface before treatment can be increased at least 1.2 times, at least 1.5 times, at least 2 times, at least 3 times, at least 5 times, at least 10 times, at least 20 times, at least 50 times, at least 70 times, at least 100 times after treatment. In some cases, the surface treatment may be increased up to 500 times after treatment. Other increases in surface energy are also possible.

As described herein, in some embodiments treatment of a surface results in chemical and/or physical bonds between an ion conductor and a polymer layer (e.g., a separator) being formed. In some embodiments, the bonds may include covalent bonds. Additionally or alternatively, non-covalent interactions (e.g., hydrophobic and/or hydrophilic interactions, electrostatic interactions, van der Waals interactions) may be formed. Generally, treatment (e.g., pre-treatment) of a surface resulting in bond formation increases the degree of adhesion between two layers compared to the absence of such treatment.

To determine relative adhesion strength between two layers, a tape test can be performed. Briefly, the tape test utilizes pressure-sensitive tape to qualitatively assess the adhesion between a first layer (e.g., a polymer layer) and a second layer (e.g., a ion conducting layer). In such a test, an X-cut can be made through the first layer (e.g., polymer layer/separator) to the second layer (e.g., ion conducting layer). Pressure-sensitive tape can be applied over the cut area and removed. If the polymer layer stays on the ion conducting layer, adhesion is good. If the polymer layer comes off with the strip of tape, adhesion is poor. The tape test may be performed according to the standard ASTM D3359-02. In some embodiments, a strength of adhesion between the separator and the inorganic ion conductor layer passes the tape test according to the standard ASTM D3359-02, meaning the ion conductor layer does not delaminate from the polymer layer during the test. In some embodiments, the tape test is performed after the two layers (e.g., a first layer such as a polymer layer/separator, to a second layer such as an ion conducting layer) have been included in a cell, such as a lithium-sulfur cell or any other appropriate cell described herein, that has been cycled at least 5 times, at least 10 times, at least 15 times, at least 20 times, at least 50 times, or at least 100 times, and the two layers pass the tape test after being removed from the cell (e.g., the first layer does not delaminate from the second layer during the test).

The peel test may include measuring the adhesiveness or force required to remove a first layer (e.g., a polymer layer) from a unit area of a surface of a second layer (e.g., a ion conducting layer), which can be measured in N/m, using a tensile testing apparatus or another suitable apparatus. Such experiments can optionally be performed in the presence of a solvent (e.g., an electrolyte) or other components to determine the influence of the solvent and/or components on adhesion.

In some embodiments, the strength of adhesion between two layers (e.g., a first layer such as a polymer layer and a second layer such as an ion conductor layer) may be increased as a result of a treatment (e.g., pre-treatment) step described herein. The strength of adhesion after treatment may range, for example, between 100 N/m to 2000 N/m. In certain embodiments, the strength of adhesion may be at least 50 N/m, at least 100 N/m, at least 200 N/m, at least 350 N/m, at least 500 N/m, at least 700 N/m, at least 900 N/m, at least 1000 N/m, at least 1200 N/m, at least 1400 N/m, at least 1600 N/m, or at least 1800 N/m. In certain embodiments, the strength of adhesion may be less than or equal to 2000 N/m, less than or equal to 1500 N/m, less than or equal to 1000 N/m, less than or equal to 900 N/m, less than or equal to 700 N/m, less than or equal to 500 N/m, less than or equal to 350 N/m, less than or equal to 200 N/m, less than or equal to 100 N/m, or less than or equal to 50 N/m. Other strengths of adhesion are also possible.

As described herein, the relative thickness of the ion conductor layer to the average pore diameter of the polymer layer (e.g., separator) may influence the degree of adhesive strength or bonding between the two layers in a composite. For instance, in some cases the thickness of the ion conductor layer may be greater than the average pore diameter (or largest pore diameter) of polymer layer (e.g., separator), which results in the formation of a smooth, dense, and homogenous ion conductor layer that resists delamination from polymer layer.

As described herein, in an electrochemical cell, the ion conductor layer may serve as a solvent barrier which acts to prevent or reduce the likelihood of a liquid electrolyte from interacting with an electroactive material (e.g., lithium metal). In some embodiments, the ability of the composite ion conductor layer-polymer layer (e.g., separator layer) to act as a barrier can be measured in part by an air permeation test (e.g., the Gurley Test). The Gurley Test determines the time required for a specific volume of air to flow through a standard area of the material. As such, larger air permeation times (Gurley-sec) generally correspond to better barrier properties.

One of ordinary skill in the art may have expected that improved barrier properties (e.g., higher air permeation times) would be achieved by using relatively thicker inorganic ion conductor layers, since thicker layers may be more difficult for fluids to penetrate across the layer. However, as described in more detail below, the inventors observed that a reduced thickness of the ion conductor layer in an inorganic ion conductor layer-separator composite resulted in an improvement in barrier properties, as measured by an increase in air permeation time using the Gurley Test, compared to inorganic ion conductor layer-separator composites having relatively thicker inorganic ion conductor layers (see Example 3 and FIG. 12). Additionally, the combination of a thin inorganic ion conductor layer and a plasma treated separator showed the highest air permeation time (and, therefore, enhanced barrier properties), compared to composites that did not include a plasma treated separator, or a composite that had a relatively thicker inorganic ion conductor layer. Without wishing to be bound by any theory, the inventors believe that high permeation times, and therefore good barrier properties, are contributed by good strength of adhesion between the two layers and good mechanical flexibility (i.e., lower film stresses) of the ion conductor layer so as to reduce the likelihood of cracking of the layer. Cracking of the ion conductor layer, similar to delamination between layers, typically results in poorer barrier properties.

In some embodiments, air permeation times of a composite described herein (e.g., an ion conductor layer-polymer layer/separator layer composite) may be at least 1,000 Gurley sec, at least 5,000 Gurley-s, at least 10,000 Gurley-s, at least 20,000 Gurley-s, at least 40,000 Gurley-s, at least 60,000 Gurley-s, at least 80,000 Gurley-s, at least 100,000 Gurley-s, at least 120,000 Gurley-s, at least 140,000 Gurley-s, at least 160,000 Gurley-s, at least 180,000 Gurley-s, at least 200,000 Gurley-s, at least 500,000 Gurley-s, or at least $10^6$ Gurley-s. In some embodiments, the composite is substantially impermeable. In some embodiments, the air permeation time may be less than or equal to $10^6$ Gurley-s, less than or equal to 500,000 Gurley-s, less than or equal to 200,000 Gurley-s, less than or equal to 150,000 Gurley-s, less than or equal to 120,000 Gurley-s, less than or equal to 80,000 Gurley-s, less than or equal to 40,000 Gurley-s, less than or equal to 20,000 Gurley-s, less than or equal to 10,000 Gurley-s, or less than or equal to 5,000 Gurley-s. The air permeation times and Gurley tests described herein refer to those performed according to TAPPI Standard T 536 om-12, which involves a pressure differential of 3 kPa and a sample size of a square inch.

An ion conductor or ion conductor layer described herein can be formed of a variety of types of materials. In certain embodiments, the material from which the ion conductor is formed may be selected to allow ions (e.g., electrochemically active ions, such as lithium ions) to pass through the ion conductor but to substantially impede electrons from passing across the ion conductor. By "substantially impedes", in this context, it is meant that in this embodiment the material allows lithium ion flux at least ten times greater than electron passage.

In some embodiments, the material used for an ion conductor layer has a high enough conductivity (e.g., at least $10^{-6}$ S/cm, or another conductivity value described herein) in its first amorphous state. The material may also be chosen for its ability to form a smooth, dense and homogenous thin films, especially on a polymer layer such as a separator. Lithium oxysulfides may especially include these characteristics.

The ion conductor can be configured to be substantially electronically non-conductive, in certain embodiments, which can inhibit the degree to which the ion conductor causes short circuiting of the electrochemical cell. In certain embodiments, all or part of the ion conductor can be formed of a material with a bulk electronic resistivity of at least about $10^4$ Ohm-meters, at least about $10^5$ Ohm-meters, at least about $10^{10}$ Ohm-meters, at least about $10^{15}$ Ohm-meters, or at least about $10^{20}$ Ohm-meters. The bulk electronic resistivity may be, in some embodiments, less than or equal to about $10^{20}$ Ohm-meters, or less than or equal to about $10^{15}$ Ohm-meters. Combinations of the above-referenced ranges are also possible. Other values of bulk electronic resistivity are also possible.

In some embodiments, the average ionic conductivity (e.g., lithium ion conductivity) of the ion conductor material is at least about $10^{-7}$ S/cm, at least about $10^{-6}$ S/cm, at least about $10^{-5}$ S/cm, at least about $10^{-4}$ S/cm, at least about $10^{-3}$ S/cm, at least about $10^{-2}$ S/cm, at least about $10^{-1}$ S/cm, at least about 1 S/cm, or at least about 10 S/cm. The average ionic conductivity may less than or equal to about 20 S/cm, less than or equal to about 10 S/cm, or less than or equal to 1 S/cm. Conductivity may be measured at room temperature (e.g., 25 degrees Celsius).

In some embodiments, the ion conductor can be a solid. In some embodiments, the ion conductor comprises or may be substantially formed of a non-polymeric material. For example, the ion conductor may comprise or may be substantially formed of an inorganic material.

Although a variety of materials can be used as an ion conductive layer, in one set of embodiments, the ion conductor layer is an inorganic ion conductive layer. For example, the inorganic ion conductor layer may be a ceramic, a glass, or a glassy-ceramic. Suitable glasses include, but are not limited to, those that may be characterized as containing a "modifier" portion and a "network" portion, as known in the art. The modifier may include a metal oxide of the metal ion conductive in the glass. The network portion may include a metal chalcogenide such as, for example, a metal oxide or sulfide. Ion conductors may include a glassy material selected from one or more of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, $LiO$, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. In some embodiments, the ion conductor comprises an oxysulfide such as lithium oxysulfide. In one embodiment, the ion conductor comprises a lithium phosphorus oxynitride in the form of an electrolyte.

In certain embodiments in which an inorganic ion conductor material described herein comprises a lithium oxysulfide, the lithium oxysulfide (or an ion conductor layer comprising a lithium oxysulfide) may have an oxide content between 0.1-20 wt %. The oxide content may be measured with respect to the total weight of the lithium oxysulfide material or the total weight of the ion conductor layer that comprises the lithium oxysulfide material. For instance, the oxide content may be at least 0.1 wt %, at least 1 wt %, at least 2 wt %, at least 5 wt %, at least 10 wt %, %, at least 15 wt %, or at least 20 wt %. In some embodiments, the oxide content may be less than or equal to 20 wt %, less than or equal to 15 wt %, less than or equal to 10 wt %, less than or equal to 5 wt %, less than or equal to 2 wt %, or less than or equal to 1 wt % of the lithium oxysulfide. Combinations of the above-noted ranges are also possible. The elemental composition, including oxide content, of a layer may be determined by methods such as energy-dispersive X-ray spectroscopy.

In some embodiments in which an inorganic ion conductor material described herein comprises a lithium oxysulfide, the lithium oxysulfide material (or an ion conductor layer comprising a lithium oxysulfide) has an atomic ratio of sulfur atoms to oxygen atoms (S:O) of between, for example, 0.5:1 to 1000:1. For instance, the atomic ratio between sulfur atoms to:oxygen atoms (S:O) in the lithium oxysulfide material (or an ion conductor layer comprising a lithium oxysulfide) may be at least 0.5:1, at least 0.667:1, at least 1:1, at least 2:1, at least 3:1, at least 4:1, at least 5:1, at least 10:1, at least 20:1, at least 50:1, at least 70:1, at least 90:1, at least 100:1, at least 200:1, at least 500:1, or at least 1000:1. The atomic ratio of sulfur atoms to oxygen atoms (S:O) in the lithium oxysulfide material (or an ion conductor layer comprising a lithium oxysulfide) may be less than or equal to 1000:1, less than or equal to 500:1, less than or equal to 200:1, less than or equal to 100:1, less than or equal to 90:1, less than or equal to 70:1, less than or equal to 50:1, less than or equal to 20:1, less than or equal to 10:1, less than or equal to 5:1, less than or equal to 3:1, or less than or equal to 2:1. Combinations of the above-noted ranges are also possible (e.g., an atomic ratio of S:O of between 0.67:1 to 1000:1, or between 4:1 to 100:1). Other ranges are also possible. The elemental composition of a layer may be determined by methods such as energy-dispersive X-ray spectroscopy.

In some embodiments, a lithium oxysulfide material described herein may have a formula of $x(yLi_2S+zLi_2O)+MS_2$ (where M is Si, Ge, or Sn), where $y+z=1$, and where x may range from 0.5-3. In certain embodiments, x is at least 0.5, at least 1.0, at least 1.5, at least 2.0, or at least 2.5. In other embodiments, x is less than or equal to 3.0, less than or equal to 2.5, less than or equal to 2.0, less than or equal to 1.5, less than or equal to 1.0, or less than or equal to 0.5. Combinations of the above-noted ranges are also possible. Other values for x are also possible.

The ion conductor may comprise, in some embodiments, an amorphous lithium-ion conducting oxysulfide, a crystalline lithium-ion conducting oxysulfide or a mixture of an amorphous lithium-ion conducting oxysulfide and a crystalline lithium-ion conducting oxysulfide, e.g., an amorphous lithium oxysulfide, a crystalline lithium oxysulfide, or a mixture of an amorphous lithium oxysulfide and a crystalline lithium oxysulfide.

In some embodiments, the inorganic ion conductor, such as a lithium oxysulfide described above, comprises a glass forming additive ranging from 0 wt % to 30 wt % of the inorganic ion conductor material. Examples of glass forming additives include, for example, $SiO_2$, $Li_2SiO_3$, $Li_4SiO_4$, $Li_3PO_4$, $LiPO_3$, $Li_3PS_4$, $LiPS_3$, $B_2O_3$, $B_2S_3$. Other glass forming additives are also possible. In certain embodiments, glass forming additives may be at least 5 wt %, at least 10 wt %, at least 15 wt %, at least 20 wt %, at least 25 wt %, or at least 30 wt % of the inorganic ion conductor material. In certain embodiments, glass forming additives may be less than or equal to 30 wt %, less than or equal to 25 wt %, less than or equal to 20 wt %, less than or equal to 15 wt %, or less than or equal to 10 wt % of the inorganic ion conductor material. Combinations of the above-noted ranges are also possible. Other values of glass forming additives are also possible.

In some embodiments, one or more additional salts (e.g., lithium salts such as LiI, LiBr, LiCl, $Li_2CO_3$, or $Li_2SO_4$) may be added to the inorganic ion conductor material at a range of, e.g., 0 to 50 mol %. Other salts are also possible. In certain embodiments, additional salts are at least 0 mol %, at least 10 mol %, at least 20 mol %, at least 30 mol %, at least 40 mol %, or at least 50 mol %. In certain embodiments, additional salts are less than or equal to 50 mol %, less than or equal to 40 mol %, less than or equal to 30 mol %, less than or equal to 20 mol %, or less than or equal to 10 mol %. Combinations of the above-noted ranges are also possible. Other values of mol % are also possible.

Additional examples of ion conductors include lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, LiO, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof.

In certain embodiments, the ion conductor is formed of a single-ion conductive material (e.g., a single-ion conductive ceramic material).

Other suitable materials that could be used to form all or part of the ion conductor include the ionically conductive materials described in U.S. Patent Publication No. 2010/0327811, filed Jul. 1, 2010 and published Dec. 30, 2010, entitled "Electrode Protection in Both Aqueous and Non-Aqueous Electromechanical Cells, Including Rechargeable Lithium Batteries," which is incorporated herein by reference in its entirety for all purposes.

Those of ordinary skill in the art, given the present disclosure, would be capable of selecting appropriate materials for use as the ion conductor. Relevant factors that might be considered when making such selections include the ionic conductivity of the ion conductor material; the ability to deposit, etch, or otherwise form the ion conductor material on or with other materials in the electrochemical cell; the brittleness of the ion conductor material; the compatibility of the ion conductor material with the polymer or separator material; the compatibility of the ion conductor material with the electrolyte of the electrochemical cell; the ion conductivity of the material (e.g., lithium ion conductivity); and/or the ability to adhere the ion conductor to the separator material.

The ion conductor material may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, etc. In certain embodiments, at least a portion of the ion conductor material may be etched or otherwise removed, after which a separator material (e.g., a polymeric separator material) may be formed over the ion conductor material.

As described herein, in certain preferred embodiments, an ion conductor material can be deposited onto a separator using a vacuum deposition process (e.g., sputtering, CVD, thermal or E-beam evaporation). Vacuum deposition can permit the deposition of smooth, dense, and homogenous thin layers. In other embodiments, the ion conductor (e.g., ceramic) can be coated by drawing and casting the ion conductor from a slurry or gel.

In embodiments in which the ion conductor is in the form of a layer (e.g., a layer adjacent and/or attached to a polymer layer (e.g., a separator)), the thickness of the ion conductor layer may vary. The thickness of an ion conductor layer may vary over a range from, for example, 1 nm to 7 microns. For instance, the thickness of the ion conductor layer may be between 1-10 nm, between 10-100 nm, between 10-50 nm, between 30-70 nm, between 100-1000 nm, or between 1-7 microns. The thickness of an ion conductor layer may, for example, be less than or equal to 7 microns, less than or equal to 5 microns, less than or equal to 2 microns, less than or equal to 1000 nm, less than or equal to 600 nm, less than or equal to 500 nm, less than or equal to 250 nm, less than or equal to 100 nm, less than or equal to 70 nm, less than or equal to 50 nm, less than or equal to 25 nm, or less than or equal to 10 nm. In some embodiments, an ion conductor layer is at least 10 nm thick, at least 20 nm thick, at least 30 nm thick, at least 100 nm thick, at least 400 nm thick, at least 1 micron thick, at least 2.5 microns thick, or at least 5 microns thick. Other thicknesses are also possible. Combinations of the above-noted ranges are also possible.

As described herein, the methods and articles provided herein may allow the formation of smooth surfaces. In some embodiments, the RMS surface roughness of an ion conductor layer of a protective structure may be, for example, less than 1 μm. In certain embodiments, the RMS surface roughness for such surfaces may be, for example, between 0.5 nm and 1 μm (e.g., between 0.5 nm and 10 nm, between 10 nm and 50 nm, between 10 nm and 100 nm, between 50 nm and 200 nm, between 10 nm and 500 nm). In some embodiments, the RMS surface roughness may be less than or equal to 0.9 μm, less than or equal to 0.8 μm, less than or equal to 0.7 μm, less than or equal to 0.6 μm, less than or equal to 0.5 μm, less than or equal to 0.4 μm, less than or equal to 0.3 μm, less than or equal to 0.2 μm, less than or equal to 0.1 μm, less than or equal to 75 nm, less than or equal to 50 nm, less than or equal to 25 nm, less than or equal to 10 nm, less than or equal to 5 nm, less than or equal to 2 nm, less than or equal to 1 nm. In some embodiments, the RMS surface roughness may be greater than 1 nm, greater than 5 nm, greater than 10 nm, greater than 50 nm, greater than 100 nm, greater than 200 nm, greater than 500 nm, or greater than 700 nm. Other values are also possible. Combinations of the above-noted ranges are also possible (e.g., a RMS surface roughness of less than or equal to 0.5 μm and greater than 10 nm. A polymer layer of a protective structure may have a RMS surface roughness of one or more of the ranges noted above.

In embodiments in which a polymer layer is positioned on a substrate (e.g., an ion conductor layer), it should be appreciated that the polymer layer may be cured or otherwise prepared directly onto the substrate, or the polymer may be added separately (e.g., as a commercial separator) in other embodiments. A polymer structure either engineered for specific properties such as pore size, or one that is commercially available, such as battery separator material, may be used as a free standing substrate for subsequent coatings as described herein. In certain embodiments, the hole paths through the polymer layer may be tortuous and may form a continuous path completely through the polymer layer. Such hole paths may allow for electrolyte penetration up to the ceramic coating, which may act as a fluid barrier and ion conductor for an electroactive species (e.g., lithium).

A polymer layer described herein can be made of a variety of materials. In some embodiments, the polymer layer can be a solid. In some cases, the polymer layer does not substantially include a solvent (like in a gel), except for solvent that may pass through or reside in the pores of the polymer layer. In some embodiments, the polymer layer is porous. The polymer layer can be configured, according to some embodiments, to inhibit (e.g., prevent) physical contact between the first electrode and the second electrode, which could result in short circuiting of the electrochemical cell. The polymer layer can be configured to be substantially electronically non-conductive, in certain embodiments, which can inhibit the degree to which the polymer layer causes short circuiting of the electrochemical cell. In certain embodiments, all or part of the polymer layer can be formed of a material with a bulk electronic resistivity of at least about $10^4$, at least about $10^5$, at least about $10^{10}$, at least about $10^{15}$, or at least about $10^{20}$ Ohm-meters.

In some embodiments, the polymer can be ionically conductive, while in other embodiments, the polymer is substantially ionically non-conductive. In some embodiments, the average ionic conductivity of the polymer is at least about $10^{-7}$ S/cm, at least about $10^{-6}$ S/cm, at least about $10^{-5}$ S/cm, at least about $10^4$ S/cm, at least about $10^{-2}$ S/cm, at least about $10^{-1}$ S/cm. In certain embodiments, the average ionic conductivity of the polymer may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^4$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible (e.g., an average ionic conductivity of at least about $10^{-8}$ S/cm and less than or equal to about $10^{-1}$ S/cm). Conductivity may be measured at room temperature (e.g., 25 degrees Celsius).

Examples of suitable polymer materials include, but are not limited to, polyolefins (e.g., polyethylenes and polypropylenes) and glass fiber filter papers. Further examples of polymers and polymer materials suitable for use include those comprising a microporous xerogel layer, for example, a microporous pseudo-boehmite layer, which may be provided either as a free standing film or by a direct coating application on one of the electrodes, as described in U.S. Pat. No. 6,153,337, filed Dec. 19, 1997 and, entitled "Separators for electrochemical cells," and U.S. Pat. No. 6,306,545 filed Dec. 17, 1998 and entitled "Separators for electrochemical cells." Solid electrolytes and gel electrolytes may also function as a polymer layer in addition to their electrolyte function. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, cross-linked and network structures of the foregoing, and blends of the foregoing, and optionally, one or more plasticizers.

Other classes polymers that may be suitable for use in the polymer layer include, but are not limited to, polyamines (e.g., poly(ethylene imine) and polypropylene imine (PPI));

polyamides (e.g., polyamide (Nylon), poly(ε-caprolactam) (Nylon 6), poly(hexamethylene adipamide) (Nylon 66)); polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from the group consisting of polyvinyl alcohol, polyisobutylene, epoxy, polyethylene, polypropylene, polytetrafluoroethylene, and combinations thereof. The mechanical and electronic properties (e.g., conductivity, resistivity) of these polymers are known. Accordingly, those of ordinary skill in the art can choose suitable polymers based on their mechanical and/or electronic properties (e.g., ionic and/or electronic conductivity), and/or can modify such polymers to be ionically conducting (e.g., conductive towards single ions) based on knowledge in the art, in combination with the description herein. For example, the polymer materials listed above may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB (Ph)$_4$, LiPF$_6$, LiC(SO$_2$CF$_3$)$_3$, and LiN(SO$_2$CF$_3$)$_2$), to enhance ionic conductivity.

Other suitable materials that could be used to form all or part of the polymer layer include the polymer materials described in U.S. Patent Publication No. 2010/0327811, filed Jul. 1, 2010 and published Dec. 30, 2010, entitled "Electrode Protection in Both Aqueous and Non-Aqueous Electromechanical Cells, Including Rechargeable Lithium Batteries," which is incorporated herein by reference in its entirety for all purposes.

Those of ordinary skill in the art, given the present disclosure, would be capable of selecting appropriate materials for use as a polymer layer. Relevant factors that might be considered when making such selections include the ionic conductivity of the polymer material; the ability to deposit or otherwise form the polymer material on or with other materials in the electrochemical cell; the flexibility of the polymer material; the porosity of the polymer material (e.g., overall porosity, pore size distribution, and/or tortuosity); the compatibility of the polymer material with the fabrication process used to form the electrochemical cell; the compatibility of the polymer material with the electrolyte of the electrochemical cell; and/or the ability to adhere the polymer material to the ion conductor material. In certain embodiments, the polymer material can be selected based on its ability to survive ion conductor deposition processes without mechanically failing. For example, in embodiments in which relatively high temperatures or high pressures are used to form the ion conductor material (e.g., a ceramic ion conductor material), the polymer material can be selected or configured to withstand such high temperatures and pressures.

Those of ordinary skill in the art can employ a simple screening test to select an appropriate polymer material from candidate materials. One simple screening test involves positioning a material as a polymer layer in an electrochemical cell which, to function, requires passage of an ionic species across the material (e.g., through pores of the material) while maintaining electronic separation. This is a simple test to employ. If the material is substantially ionically conductive in this test, then electrical current will be generated upon discharging the electrochemical cell. Another simple screening test involves the ability to increase the surface energy of the polymer by various methods described herein. A screening test may also involve testing the adhesion between the polymer and an ion conductor layer as described herein. Another screening test may involve testing the ability of the separator to not swell in the presence of an electrolyte to be used in an electrochemical cell. Other simple tests can be conducted by those of ordinary skill in the art.

The thickness of the polymer layer may vary. The thickness of the polymer layer may be less than or equal to, e.g., 40 microns, less than or equal to 30 microns, less than or equal to 25 microns, less than or equal to 10 microns, less than or equal to 5 microns, less than or equal to 3 microns, less than or equal to 2 microns, less than or equal to 1 micron, less than or equal to 0.5 microns, less than or equal to 0.1 microns, less than or equal to 0.05 microns. In some embodiments, the polymer layer is at least 0.01 microns thick, at least 0.05 microns thick, at least 0.1 microns thick, at least 0.5 microns thick, at least 1 micron thick, at least 2 microns thick, at least 5 microns thick, at least 10 microns thick, at least 20 microns thick, at least 25 microns thick, at least 30 microns thick, or at least 40 microns thick. Other thicknesses are also possible. Combinations of the above-noted ranges are also possible.

As described herein, a polymer layer may have a smooth surface. In some embodiments, the RMS surface roughness of a polymer layer may be, for example, less than 1 μm. In certain embodiments, the RMS surface roughness for such surfaces may be, for example, between 0.5 nm and 1 μm (e.g., between 0.5 nm and 10 nm, between 10 nm and 50 nm, between 10 nm and 100 nm, between 50 nm and 200 nm, between 10 nm and 500 nm). In some embodiments, the RMS surface roughness may be less than or equal to 0.9 μm, less than or equal to 0.8 μm, less than or equal to 0.7 μm, less than or equal to 0.6 μm, less than or equal to 0.5 μm, less than or equal to 0.4 μm, less than or equal to 0.3 μm, less than or equal to 0.2 μm, less than or equal to 0.1 μm, less than or equal to 75 nm, less than or equal to 50 nm, less than or equal to 25 nm, less than or equal to 10 nm, less than or equal to 5 nm, less than or equal to 2 nm, less than or equal to 1 nm. In some embodiments, the RMS surface roughness may be greater than 1 nm, greater than 5 nm, greater than 10 nm, greater than 50 nm, greater than 100 nm, greater than 200 nm, greater than 500 nm, or greater than 700 nm. Other values are also possible. Combinations of the above-noted ranges are also possible (e.g., a RMS surface roughness of less than or equal to 0.5 µm and greater than 10 nm).

As described herein, the polymer layer may be porous. In some embodiments, the polymer pore size may be, for example, less than 5 microns. In certain embodiments, the polymer pore size may be between 50 nm and 5 microns, between 50 nm and 500 nm, between 100 nm and 300 nm, between 300 nm and 1 micron, between 500 nm and 5 microns. In some embodiments, the pore size may be less than or equal to 5 microns, less than or equal to 1 micron, less than or equal to 500 nm, less than or equal to 300 nm, less than or equal to 100 nm, or less than or equal to 50 nm. In some embodiments, the pore size may be greater than 50 nm, greater than 100 nm, greater than 300 nm, greater than 500 nm, or greater than 1 micron. Other values are also possible. Combinations of the above-noted ranges are also possible (e.g., a pore size of less than 300 nm and greater than 100 nm).

As described herein, the relative thickness of the ion conductor layer to the average pore diameter of the polymer layer may influence the degree of adhesive strength of the two layers. For instance, the thickness of the ion conductor layer may be greater than the average pore diameter (or largest pore diameter) of polymer layer. In certain embodiments, the average thickness of the ion conductor layer is at least 1.1 times, at least 1.2 times, at least 1.5 times, at least 1.7 times, at least 2 times, at least 2.5 times, at least 2.7 times, at least 2.8 times, at least 3.0 times, at least 3.2 times, at least 3.5 times, at least 3.8 times, at least 4.0 times, at least 5.0 times, at least 7.0 times, at least 10.0 times, or at least 20.0 times the average pore size (or the largest pore diameter) of the polymer layer adjacent the ion conductor layer. In certain embodiments, the average thickness of the ion conductor layer may be less than or equal to 20.0 times, less than or equal to 10.0 times, less than or equal to 7.0 times, less than or equal to 5.0 times, less than or equal to 4.0 times, less than or equal to 3.8 times, less than or equal to 3.5 times, less than or equal to 3.2 times, less than or equal to 3.0 times, less than or equal to 2.8 times, less than or equal to 2.5 times, or less than or equal to 2 times the average pore size (or the largest pore diameter) of the polymer layer adjacent the ion conductor layer. Other combinations of average pore diameter and ion conductor layer thicknesses are also possible.

The ratio of thickness of the ion conductor layer to average pore diameter of the polymer layer may be, for example, at least 1:1 (e.g., 1.1:1), at least 2:1, at least 3:2, at least 3:1, at least 4:1, at least 5:1, or at least 10:1. The ratio of thickness of the ion conductor layer to average pore diameter of the polymer layer may be less than or equal to 10:1, less than or equal to 5:1, less than or equal to 3:1, less than or equal to 2:1 (e.g., 1.1:1), or less than or equal to 1:1. Other ratios are also possible. Combinations of the above-noted ranges are also possible.

The separator can be configured, according to some embodiments, to inhibit (e.g., prevent) physical contact between the first electrode and the second electrode, which could result in short circuiting of the electrochemical cell. The separator can be configured to be substantially electronically non-conductive, which can inhibit the degree to which the separator causes short circuiting of the electrochemical cell. In certain embodiments, all or portions of the separator can be formed of a material with a bulk electronic resistivity of at least about $10^4$, at least about $10^5$, at least about $10^{10}$, at least about $10^{15}$, or at least about $10^{20}$ Ohm-meters. Bulk electronic resistivity may be measured at room temperature (e.g., 25 degrees Celsius).

In some embodiments, the separator can be ionically conductive, while in other embodiments, the separator is substantially ionically non-conductive. In some embodiments, the average ionic conductivity of the separator is at least about $10^{-7}$ S/cm, at least about $10^{-6}$ S/cm, at least about $10^{-5}$ S/cm, at least about $10^{-4}$ S/cm, at least about $10^{-2}$ S/cm, at least about $10^{-1}$ S/cm. In certain embodiments, the average ionic conductivity of the separator may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible (e.g., an average ionic conductivity of at least about $10^{-8}$ S/cm and less than or equal to about $10^{-1}$ S/cm).

In some embodiments, the separator can be a solid. The separator may be porous to allow an electrolyte solvent to pass through it. In some cases, the separator does not substantially include a solvent (like in a gel), except for solvent that may pass through or reside in the pores of the separator. In other embodiments, a separator may be in the form of a gel.

In certain embodiments, a separator may comprise a mixture of a polymeric binder, which may include one or more polymeric materials described herein (e.g., the polymers listed below for the separator), and a filler comprising a ceramic or a glassy/ceramic material, such as a material described herein for an ion conductor layer. A separator as described herein can be made of a variety of materials. The separator may be polymeric in some instances, or formed of an inorganic material (e.g., glass fiber filter papers) in other instances. Examples of suitable separator materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(m-ethylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly (vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

The mechanical and electronic properties (e.g., conductivity, resistivity) of these polymers are known. Accordingly, those of ordinary skill in the art can choose suitable materials based on their mechanical and/or electronic properties (e.g., ionic and/or electronic conductivity/resistivity), and/or can modify such polymers to be ionically conducting (e.g., conductive towards single ions) based on knowledge in the art, in combination with the description herein. For example, the polymer materials listed above and herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity, if desired.

Further examples of separators and separator materials suitable for use include those comprising a microporous xerogel layer, for example, a microporous pseudo-boehmite layer, which may be provided either as a free standing film or by a direct coating application on one of the electrodes, as described in U.S. Pat. No. 6,153,337, filed Dec. 19, 1997 and, entitled "Separators for electrochemical cells," and U.S. Pat. No. 6,306,545 filed Dec. 17, 1998 and entitled "Separators for electrochemical cells." Solid electrolytes and gel electrolytes may also function as a separator in addition to their electrolyte function. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Other suitable materials that could be used to form all or part of the separator include the separator materials described in U.S. Patent Publication No. 2010/0327811, filed Jul. 1, 2010 and published Dec. 30, 2010, entitled "Electrode Protection in Both Aqueous and Non-Aqueous Electromechanical Cells, Including Rechargeable Lithium Batteries," which is incorporated herein by reference in its entirety for all purposes.

Those of ordinary skill in the art, given the present disclosure, would be capable of selecting appropriate materials for use as the separator. Relevant factors that might be considered when making such selections include the ionic conductivity of the separator material; the ability to deposit or otherwise form the separator material on or with other materials in the electrochemical cell; the flexibility of the separator material; the porosity of the separator material (e.g., overall porosity, average pore size, pore size distribution, and/or tortuosity); the compatibility of the separator material with the fabrication process used to form the electrochemical cell; the compatibility of the separator material with the electrolyte of the electrochemical cell; and/or the ability to adhere the separator material to the ion conductor material. In certain embodiments, the separator material can be selected based on its ability to survive ion conductor deposition processes without mechanically failing. For example, in embodiments in which relatively high temperatures or high pressures are used to form the ion conductor material (e.g., a ceramic ion conductor material), the separator material can be selected or configured to withstand such high temperatures and pressures.

Those of ordinary skill in the art can employ a simple screening test to select an appropriate separator material from candidate materials. One simple screening test involves positioning a material as a separator in an electrochemical cell which, to function, requires passage of an ionic species across the material (e.g., through pores of the material) while maintaining electronic separation. If the material is substantially ionically conductive in this test, then electrical current will be generated upon discharging the electrochemical cell. Another simple screening test involves the ability to increase the surface energy of the separator by various methods described herein. A screening test may also involve testing the adhesion between a polymer layer/separator and an ion conductor layer as described herein. Another screening test may involve testing the ability of the polymer layer/separator to not swell in the presence of an electrolyte to be used in an electrochemical cell. Other simple tests can be conducted by those of ordinary skill in the art.

The thickness of the separator may vary. The thickness of the separator may vary over a range from, for example, 5 microns to 40 microns. For instance, the thickness of the separator may be between 10-20 microns, between 20-30 microns, or between 20-40 microns. The thickness of the separator may be less than or equal to, e.g., 40 microns, less than or equal to 30 microns, less than or equal to 25 microns, less than or equal to 10 microns, or less than or equal to 9 microns. In some embodiments, the separator is at least 9 microns thick, at least 10 microns thick, at least 20 microns thick, at least 25 microns thick, at least 30 microns thick, or at least 40 microns thick. Other thicknesses are also possible. Combinations of the above-noted ranges are also possible.

As described herein, a separator may have a smooth surface. In some embodiments, the RMS surface roughness of a separator may be, for example, less than 1 μm. In certain embodiments, the RMS surface roughness for such surfaces may be, for example, between 0.5 nm and 1 μm (e.g., between 0.5 nm and 10 nm, between 10 nm and 50 nm, between 10 nm and 100 nm, between 50 nm and 200 nm, between 10 nm and 500 nm). In some embodiments, the RMS surface roughness may be less than or equal to 0.9 μm, less than or equal to 0.8 μm, less than or equal to 0.7 μm, less than or equal to 0.6 μm, less than or equal to 0.5 μm, less than or equal to 0.4 μm, less than or equal to 0.3 μm, less than or equal to 0.2 μm, less than or equal to 0.1 μm, less than or equal to 75 nm, less than or equal to 50 nm, less than or equal to 25 nm, less than or equal to 10 nm, less than or equal to 5 nm, less than or equal to 2 nm, less than or equal to 1 nm. In some embodiments, the RMS surface roughness may be greater than 1 nm, greater than 5 nm, greater than 10 nm, greater than 50 nm, greater than 100 nm, greater than 200 nm, greater than 500 nm, or greater than 700 nm. Other values are also possible. Combinations of the above-noted ranges are also possible (e.g., a RMS surface roughness of less than or equal to 0.5 μm and greater than 10 nm.

As described herein, the separator may be porous. In some embodiments, the separator pore size may be, for example, less than 5 microns. In certain embodiments, the separator pore size may be between 50 nm and 5 microns, between 50 nm and 500 nm, between 100 nm and 300 nm, between 300 nm and 1 micron, between 500 nm and 5 microns. In some embodiments, the pore size may be less than or equal to 5 microns, less than or equal to 1 micron, less than or equal to 500 nm, less than or equal to 300 nm, less than or equal to 100 nm, or less than or equal to 50 nm. In some embodiments, the pore size may be greater than 50 nm, greater than 100 nm, greater than 300 nm, greater than 500 nm, or greater than 1 micron. Other values are also possible. Combinations of the above-noted ranges are also possible (e.g., a pore size of less than 300 nm and greater than 100 nm).

As described herein, the relative thickness of the ion conductor layer to the average pore diameter of the separator, which is positioned adjacent the ion conductor layer, may influence the degree of adhesive strength of the two layers. For instance, the thickness of the ion conductor layer may be greater than the average pore diameter (or largest pore diameter) of separator. In certain embodiments, the average thickness of the ion conductor layer is at least 1.1 times, at least 1.2 times, at least 1.5 times, at least 1.7 times, at least 2 times, at least 2.5 times, at least 2.7 times, at least 2.8 times, at least 3.0 times, at least 3.2 times, at least 3.5 times, at least 3.8 times, at least 4.0 times, at least 5.0 times, at least 7.0 times, at least 10.0 times, or at least 20.0 times the average pore size (or the largest pore diameter) of the separator adjacent the ion conductor layer. In certain embodiments, the average thickness of the ion conductor layer may be less than or equal to 20.0 times, less than or equal to 10.0 times, less than or equal to 7.0 times, less than or equal to 5.0 times, less than or equal to 4.0 times, less than or equal to 3.8 times, less than or equal to 3.5 times, less than or equal to 3.2 times, less than or equal to 3.0 times, less than or equal to 2.8 times, less than or equal to 2.5 times, or less than or equal to 2 times the average pore size (or the largest pore diameter) of the separator adjacent the ion conductor layer. Other combinations of average pore diameter and ion conductor layer thicknesses are also possible.

The ratio of thickness of the ion conductor layer to average pore diameter of the separator may be, for example, at least 1:1 (e.g., 1.1:1), at least 2:1, at least 3:2, at least 3:1, at least 4:1, at least 5:1, or at least 10:1. The ratio of thickness of the ion conductor layer to average pore diameter of the separator may be less than or equal to 10:1, less than or equal to 5:1, less than or equal to 3:1, less than or equal to 2:1 (e.g., 1.1:1), or less than or equal to 1:1. Other ratios are also possible. Combinations of the above-noted ranges are also possible.

As described herein, various methods may be used to form an ion conductor/polymer (e.g., ion conductor/separator) composite. In certain embodiments in which a composite includes a polymer layer in the form of a separator, the thickness of the composite ion conductor/polymer layers may vary over a range from, for example, 5 microns to 40 microns. For instance, the thickness of the composite may be between 10-20 microns, between 20-30 microns, or between 20-40 microns. The thickness of the composite may be, for example, less than or equal to 40 microns, less than or equal to 30 microns, less than or equal to 25 microns, less than or equal to 10 microns, less than or equal to 9 microns, or less than or equal to 7 microns. In some embodiments, the composite is at least 5 microns thick, at least 7 microns thick, at least 9 microns thick, at least 10 microns thick, at least 20 microns thick, at least 25 microns thick, at least 30 microns thick, or at least 40 microns thick. Other thicknesses are also possible. Combinations of the above-noted ranges are also possible.

As described herein, in some embodiments the pores of an ion conductor/polymer composite may be substantially unfilled with the ion conductor material. In some such embodiments, vacuum coating methods such as chemical vapor deposition, e-beam, sputtering, or thermal ceramic deposition may be used to form the ion conductor layer. Other methods, such as those described herein, can also be used.

In other instances, all or at least portions of the pores may be filled with the ion conductor material. In some such embodiments, the ion conductor layer may be deposited by a vacuum sputtering process. In other embodiments, a non-vacuum method such as infiltration by a slurry or gel, may also be suitable. Non-vacuum methods may especially be used in instances in which there is a relatively high ratio of ion conductor thickness to pore diameter of the polymer. Other methods, such as those described herein, can also be used.

The relative aspect ratio of pore depth to pore diameter of the polymer layer (e.g., separator) may influence whether or not the pores of the polymer layer will be at least partially filled with the ion conductor material. In some embodiments, the aspect ratio of pore depth to pore diameter of the polymer layer (e.g., separator) may range from, for example, 0.1 to 10.0. In certain embodiments, the aspect ratio of pore depth to pore diameter may be at least 0.1, at least 0.2, at least 0.3, at least 0.5, at least 1.0, at least 2.0, at least 5.0, or at least 10.0. The aspect ratio of pore depth to pore diameter may be, for example, less than or equal to 10.0, less than or equal to 5.0, less than or equal to 2.0, less than or equal to 1.0, less than or equal to 0.5, less than or equal to 0.3, less than or equal to 0.2, or less than or equal to 0.1. Combinations of the above-referenced ranges are also possible. Other aspect ratios are also possible.

In certain embodiments, the aspect ratio of pore depth to pore diameter is greater than 0.3 in order to at least partially fill pores with an ion conductive material using e-beam evaporation. Other methods such as sputtering may also be suitable for pore filling with higher aspect ratios.

In some embodiments, the average ionic conductivity (e.g., lithium ion conductivity) of the composite is at least about $10^{-7}$ S/cm, at least about $10^{-6}$ S/cm, at least about $10^{-5}$ S/cm, at least about $10^{4}$ S/cm, at least about $10^{-2}$ S/cm, at least about $10^{-1}$ S/cm, at least about 1 S/cm, at least about 10 S/cm. Conductivity may be measured at room temperature (e.g., 25 degrees Celsius).

A composite structure described herein including an ion conductor layer and a separator/polymer layer may be a free-standing structure that may be packaged alone (optionally with suitable components such as a substrate for handling), together with an electroactive material to form a protected electrode, or assembled into an electrochemical cell.

In certain embodiments, an electrochemical cell comprises a first electrode comprising an electroactive material, a second electrode and a composite positioned between the first and second electrodes. The composite comprises a separator comprising pores having an average pore size and an inorganic ion conductor layer bonded to the separator. The separator may have a bulk electronic resistivity of at least $10^4$ Ohm meters, at least $10^{10}$ Ohm meters, or at least $10^{15}$ Ohm meters, e.g., between $10^{10}$ Ohm meters to $10^{15}$ Ohm meters.

The inorganic ion conductor layer may have an ion (e.g., lithium ion) conductivity of at least $10^{-6}$ S/cm at 25 degrees Celsius. In certain embodiments, the inorganic ion conductor layer has an ion (e.g., lithium ion) conductivity of at least $10^{-5}$ S/cm, at least $10^{-4}$ S/cm, or at least $10^{-3}$ S/cm at 25 degrees Celsius.

The inorganic ion conductor layer may comprises a ceramic, a glass, or a glass-ceramic. In one set of embodiments, the inorganic ion conductor layer comprises an lithium oxysulfide.

The strength of adhesion between the separator and the inorganic ion conductor layer may be sufficiently strong to pass the tape test according to the standard ASTM D3359-02, in some instances. The strength of adhesion between the separator and the inorganic ion conductor layer may be, in some cases, at least 350 N/m or at least 500 N/m. In some embodiments, the inorganic ion conductor layer is bonded to the separator by covalent bonding. Covalent bonding may be achieved by suitable methods described herein, and one embodiment, involves plasma treatment of the separator prior to addition or joining of the inorganic ion conductor layer and the separator.

In some embodiments, a ratio of a thickness of the inorganic ion conductor layer to the average pore size of the separator is at least 1.1:1 (e.g., at least 2:1, at least 3:1, or at least 5:1).

In some embodiments, the inorganic ion conductor layer has a thickness of less than or equal to 2.0 microns, less than or equal to 1.5 microns, less than or equal to 1.3 microns, less than or equal to 1 micron, less than or equal to 800 nm, less than or equal to 600 nm, or between 400 nm and 600 nm.

In some embodiments, a separator having a thickness between 5 microns and 40 microns is included. In certain embodiments, the separator is a solid, polymeric separator. For instance, the separator may comprises or be formed of one or more of poly(n-pentene-2), polypropylene, polytetrafluoroethylene, a polyamide (e.g., polyamide (Nylon), poly(ε-caprolactam) (Nylon 6), poly(hexamethylene adipamide) (Nylon 66)), a polyimide (e.g., polynitrile, and poly(pyromellitimide-1,4-diphenyl ether) (Kapton®) (NOMEX®) (KEVLAR®)), polyether ether ketone (PEEK), and combinations thereof. The separator may also comprise or be formed of other polymers or materials described herein.

In certain embodiments, a separator may comprise a mixture of a polymeric binder and a filler comprising a ceramic or a glassy/ceramic material, such as a material described herein for an ion conductor layer.

The separator may have an average pore size of less than or equal to 5 microns, less than or equal to 1 micron, less than or equal to 0.5 microns, between 0.05-5 microns, or between 0.1-0.3 microns.

The composite may have an air permeation time of at least 20,000 Gurley-s, at least 40,000 Gurley-s, at least 60,000 Gurley-s, at least 80,000 Gurley-s, at least 100,000 Gurley-s, or at least 120,000 Gurley-s according to Gurley test TAPPI Standard T 536 om-12. The composite may have an air permeation time of less than or equal to 300,000 Gurley-s according to Gurley test TAPPI Standard T 536 om-12.

The composite may be formed by, for example, depositing the inorganic ion conductor layer onto the separator by a vacuum deposition process such as electron beam evaporation or by a sputtering process.

Although the composites described herein may be used in various electrochemical cells, in one set of embodiments, the composite is included in a lithium cell, such as a lithium-sulfur cell. Accordingly, a first electrode may comprise lithium, such as lithium metal and/or a lithium alloy, as a first electroactive material, and a second electrode comprises sulfur as a second electroactive material.

In one set of embodiments, the electrochemical cell is a lithium-sulfur cell comprising a first electrode comprising lithium, a second electrode comprising sulfur, a separator arranged between said first electrode and said second electrode, and a solid ion conductor contacting and/or bonded to the separator.

In some embodiments, the solid ion conductor is an inorganic ion conductor layer bonded to the separator, wherein a ratio of a thickness of the inorganic ion conductor layer to the average pore size of the separator is at least 1.1:1.

In embodiments in which a polymer layer is positioned on a substrate (e.g., an ion conductor layer), e.g., as part of a multi-layer protective structure, it should be appreciated that the polymer layer may be cured or otherwise prepared directly onto the substrate, or the polymer may be added separately to the substrate.

The polymer layer can be a solid (e.g., as opposed to a gel). The polymer layer can be configured to be electronically non-conductive, in certain embodiments, and may be formed of a material with a bulk electronic resistivity of at least about $10^4$, at least about $10^5$, at least about $10^{10}$, at least about $10^{15}$, or at least about $10^{20}$ Ohm-meters.

In some embodiments, the polymer can be ionically conductive. In some embodiments, the average ionic conductivity of the polymer is at least about $10^{-7}$ S/cm, at least about $10^{-6}$ S/cm, at least about $10^{-5}$ S/cm, at least about $10^4$ S/cm, at least about $10^{-2}$ S/cm, at least about $10^{-1}$ S/cm. In certain embodiments, the average ionic conductivity of the polymer may be less than or equal to about 1 S/cm, less than or equal to about $10^{-1}$ S/cm, less than or equal to about $10^{-2}$ S/cm, less than or equal to about $10^{-3}$ S/cm, less than or equal to about $10^4$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible (e.g., an average ionic conductivity of at least about $10^{-8}$ S/cm and less than or equal to about $10^{-1}$ S/cm). Conductivity may be measured at room temperature (e.g., 25 degrees Celsius).

A polymer layer described herein can be made of a variety of materials. Examples of materials that may be suitable for use in the polymer layer include, but are not limited to, polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly (isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly (ethylene oxide) (PEO), poly(propylene oxide) (PPO), poly (tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from the group consisting of polyvinyl alcohol, polyisobutylene, epoxy, polyethylene, polypropylene, polytetrafluoroethylene, and combinations thereof. The mechanical and electronic properties (e.g., conductivity, resistivity) of these polymers are known. Accordingly, those of ordinary skill in the art can choose suitable polymers based on their mechanical and/or electronic properties (e.g., ionic and/or electronic conductivity), and/or can modify such polymers to be ionically conducting (e.g., conductive towards single ions) based on knowledge in the art, in combination with the description herein. For example, the polymer materials listed above may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity.

Those of ordinary skill in the art, given the present disclosure, would be capable of selecting appropriate materials for use as a polymer layer. Relevant factors that might be considered when making such selections include the ionic conductivity of the polymer material; the ability to deposit or otherwise form the polymer material on or with other materials in the electrochemical cell; the flexibility of the polymer material; the porosity of the polymer material (e.g., overall porosity, pore size distribution, and/or tortuosity); the compatibility of the polymer material with the fabrication process used to form the electrochemical cell; the compatibility of the polymer material with the electrolyte of the electrochemical cell; and/or the ability to adhere the polymer material to the ion conductor material.

The thickness of the polymer layer may vary. The thickness of the polymer layer may be less than or equal to, e.g., 40 microns, less than or equal to 30 microns, less than or equal to 25 microns, less than or equal to 10 microns, less than or equal to 5 microns, less than or equal to 3 microns, less than or equal to 2 microns, less than or equal to 1 micron, less than or equal to 0.5 microns, less than or equal to 0.1 microns, less than or equal to 0.05 microns. In some embodiments, the polymer layer is at least 0.01 microns thick, at least 0.05 microns thick, at least 0.1 microns thick, at least 0.5 microns thick, at least 1 micron thick, at least 2 microns thick, at least 5 microns thick, at least 10 microns thick, at least 20 microns thick, at least 25 microns thick, at least 30 microns thick, or at least 40 microns thick. Other thicknesses are also possible. Combinations of the above-noted ranges are also possible.

In some embodiments, an electrode, such as a first electrode (e.g., electrode 102 in FIGS. 1A and 1B) comprises an electroactive material comprising lithium. Suitable electroactive materials comprising lithium include, but are not limited to, lithium metal (such as lithium foil and/or lithium deposited onto a conductive substrate) and lithium metal alloys (e.g., lithium-aluminum alloys and lithium-tin alloys). In some embodiments, the electroactive lithium-containing material of an electrode comprises greater than 50 wt % lithium. In some cases, the electroactive lithium-containing material of an electrode comprises greater than 75 wt % lithium. In still other embodiments, the electroactive lithium-containing material of an electrode comprises greater than 90 wt % lithium. Other examples of electroactive materials that can be used (e.g., in the first electrode, which can be a negative electrode) include, but are not limited to, other alkali metals (e.g., sodium, potassium, rubidium, caesium, francium), alkaline earth metals (e.g., beryllium, magnesium, calcium, strontium, barium, radium), and the like. In some embodiments, the first electrode is an electrode for a lithium ion electrochemical cell. In some cases, the first electrode is an anode or negative electrode.

The second electrode (e.g., electrode 102 in FIGS. 1A and 1B) can comprise a variety of suitable electroactive materials. In some cases, the second electrode is a cathode or positive electrode.

In some embodiments, the electroactive material within an electrode (e.g., within a positive electrode) can comprise metal oxides, such as LiCoO$_2$, LiCo$_x$Ni$_{(1-x)}$O$_2$, LiCo$_x$Ni$_y$Mn$_{(1-x-y)}$ (e.g., LiNi$_{1/3}$Mn$_{1/3}$Co$_{1/3}$O$_2$), LiMn$_2$O$_4$, and combinations thereof. In some embodiments, the electrode active material within an electrode (e.g., within a positive electrode) can comprise lithium transition metal phosphates (e.g., LiFePO$_4$), which can, in certain embodiments, be substituted with borates and/or silicates.

In certain embodiments, the electroactive material within an electrode (e.g., within a positive electrode) can comprise electroactive transition metal chalcogenides, electroactive conductive polymers, and/or electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf. Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, an electrode (e.g., a positive electrode) can comprise an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. In certain embodiments, it may be desirable to use polypyrroles, polyanilines, and/or polyacetylenes as conductive polymers.

In certain embodiments, the electrode active material within an electrode (e.g., within a positive electrode) can comprise sulfur. In some embodiments, the electroactive material within an electrode can comprise electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., S$_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a positive electrode) comprises at least about 40 wt % sulfur. In some cases, the electroactive sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

While sulfur is described predominately as an electroactive species in the second electrode (which can be, for example, a porous positive electrode), it is to be understood that wherever sulfur is described as a component of an electroactive material within an electrode herein, any suitable electroactive species may be used. For example, in certain embodiments, the electroactive species within the second electrode (e.g., a porous positive electrode) can comprise a hydrogen-absorbing alloy, such as those commonly used in nickel metal hydride batteries. One of ordinary skill in the art, given the present disclosure, would be capable of extending the ideas described herein to electrochemical cells containing electrodes employing other active materials.

The embodiments described herein may be used in association with any type of electrochemical cell. In certain embodiments, the electrochemical cell is a primary (non-rechargeable) battery. In other embodiments, the electrochemical cell may be a secondary (rechargeable) battery. Certain embodiments relate to lithium rechargeable batteries. In certain embodiments, the electrochemical cell comprises a lithium-sulfur rechargeable battery. However, wherever lithium batteries are described herein, it is to be understood that any analogous alkali metal battery can be used. Additionally, although embodiments of the invention are particularly useful for protection of a lithium anode, the embodiments described herein may be applicable to other applications in which electrode protection is desired.

Any suitable electrolyte may be used in the electrochemical cells described herein. Generally, the choice of electrolyte will depend upon the chemistry of the electrochemical cell, and, in particular, the species of ion that is to be transported between electrodes in the electrochemical cell. Suitable electrolytes can comprise, in some embodiments, one or more ionic electrolyte salts to provide ionic conductivity and one or more liquid electrolyte solvents, gel polymer materials, or other polymer materials. Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes (e.g., 1,3-dioxolane), N-alkylpyrrolidones, bis(trifluoromethanesulfonyl)imide, substituted forms of the foregoing, and blends thereof. Fluorinated derivatives of the foregoing are also useful as liquid electrolyte solvents. In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

The electrolyte can comprise one or more ionic electrolyte salts to provide ionic conductivity. In some embodiments, one or more lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$) can be included. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. A range of concentrations of the ionic lithium salts in the solvent may be used such as from about 0.2 m to about 2.0 m (m is moles/kg of solvent). In some embodiments, a concentration in the range between about 0.5 m to about 1.5 m is used. The addition of ionic lithium salts to the solvent is optional in that upon discharge of Li/S cells the lithium sulfides or polysulfides formed typically provide ionic conductivity to the electrolyte, which may make the addition of ionic lithium salts unnecessary.

It should be understood that the electrochemical cells and components shown in is the figures are exemplary, and the orientation of the components can be varied. Additionally, non-planar arrangements, arrangements with proportions of materials different than those shown, and other alternative arrangements are useful in connection with certain embodiments of the present invention. A typical electrochemical cell could also include, for example, a containment structure, current collectors, external circuitry, and the like. Those of ordinary skill in the art are well aware of the many arrangements that can be utilized with the general schematic arrangement as shown in the figures and described herein.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U. S. Pub. No. 2007-0221265, and entitled "Rechargeable Lithium/Water, Lithium/Air Batteries"; International Patent Apl. Serial No. PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No. PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries";

patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No. PCT/US2008/010894, filed Sep. 19, 2008, published as International Pub. No. WO/2009042071, and entitled "Electrolyte Additives for Lithium Batteries and Related Methods"; International Patent Apl. Serial No. PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. Patent Apl. Ser. No. 12,471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, entitled "Release System for Electrochemical cells (which claims priority to Provisional Patent Apl. Ser. No. 61/236,322, filed Aug. 24, 2009, entitled "Release System for Electrochemical Cells"); U.S. patent application Ser. No. 13/216,559, filed on Aug. 24, 2011, published as U.S. Patent Publication No. 2012/0048729, entitled "Electrically Non-Conductive Materials for Electrochemical Cells;" U.S. Provisional Patent Apl. Ser. No. 61/376,554, filed on Aug. 24, 2010, entitled "Electrically Non-Conductive Materials for Electrochemical Cells;" U.S. patent application Ser. No. 12/862,528, filed on Aug. 24, 2010, published as U.S. Patent Publication No. 2011/0177398, entitled "Electrochemical Cell;" U.S. patent application Ser. No. 12/862,563, filed on Aug. 24, 2010, published as U.S. Pub. No. 2011/0070494, entitled "Electrochemical Cells Comprising Porous Structures Comprising Sulfur"; U.S. patent application Ser. No. 12/862,551, filed on Aug. 24, 2010, published as U.S. Pub. No. 2011/0070491, entitled "Electrochemical Cells Comprising Porous Structures Comprising Sulfur"; U.S. patent application Ser. No. 12/862,576, filed on Aug. 24, 2010, published as U.S. Pub. No. 2011/0059361, entitled "Electrochemical Cells Comprising Porous Structures Comprising Sulfur"; U.S. patent application Ser. No. 12/862,581, filed on Aug. 24, 2010, published as U.S. Pub. No. 2011/0076560, entitled "Electrochemical Cells Comprising Porous Structures Comprising Sulfur"; U.S. patent application Ser. No. 13/240,113, filed on Sep. 22, 2011, published as U.S. Patent Pub. No. 2012/0070746, entitled "Low Electrolyte Electrochemical Cells"; U.S. Patent Apl. Ser. No. 61/385,343, filed on Sep. 22, 2010, entitled "Low Electrolyte Electrochemical Cells"; and U.S. patent application Ser. No. 13/033,419, filed Feb. 23, 2011, published as U.S. Patent Pub. No. 2011/0206992, entitled "Porous Structures for Energy Storage Devices"; U.S. patent application Ser. No. 13/789,783, filed Mar. 9, 2012, published as U.S. Patent Pub. No. 2013/0252103, and entitled "Porous Support Structures, Electrodes Containing Same, and Associated Methods"; U.S. patent Pub. Ser. No. 13/644,933, filed Oct. 4, 2012, published as U.S. Patent Pub. No. 2013/0095380, and entitled "Electrode Structure and Method for Making the Same"; U.S. patent application Ser. No. 14/150,156, filed Jan. 8, 2014, and entitled "Conductivity Control in Electrochemical Cells"; U.S. patent application Ser. No. 13/833,377, filed Mar. 15, 2013, and entitled "Protective Structures for Electrodes"; and U.S. Provisional Patent Apl. No. 61/787,897, filed Mar. 15, 2013, and entitled "Protected Electrode Structures and Methods". All other patents and patent applications disclosed herein are also incorporated by reference in their entirety for all purposes.

The following example is intended to illustrate certain embodiments of the present invention, but does not exemplify the full scope of the invention.

EXAMPLES

Example 1A

This example describes a method for generating an ion conductor layer on a free-standing separator (e.g., an ion conductor-separator composite), with improved adhesive strength between the layers.

A commercial separator, Celgard 2400, having a pore diameter between 100 nm to 200 nm, was used as a substrate. The separator was pre-treated with plasma using an Anode Layer Ion Source in a chamber at a pressure of $10^{-3}$ Torr, a power of 50 W, in the presence of argon gas. The treatment continued for 7 minutes. Before plasma treatment, the surface energy of the separator was 32 dynes. The separator surface energy after plasma treatment was greater than 70 dynes, as measured by a dyne pen set.

Figure 11A:
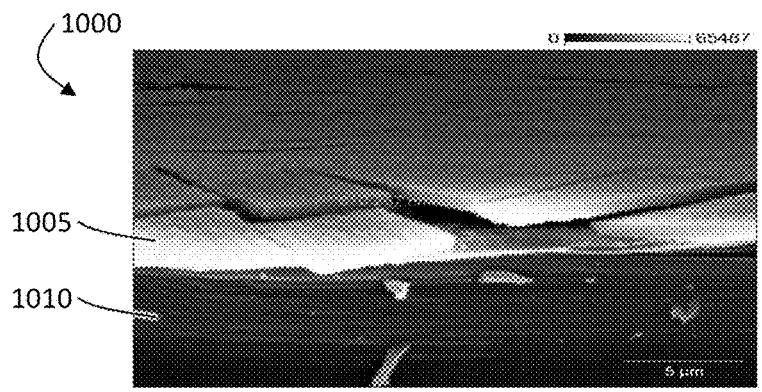
FIGS. 11A, 11B, and 11C are exemplary scanning electron microscopy (SEM) images of ceramic coatings deposited on a commercial separator.
Figure 11B:
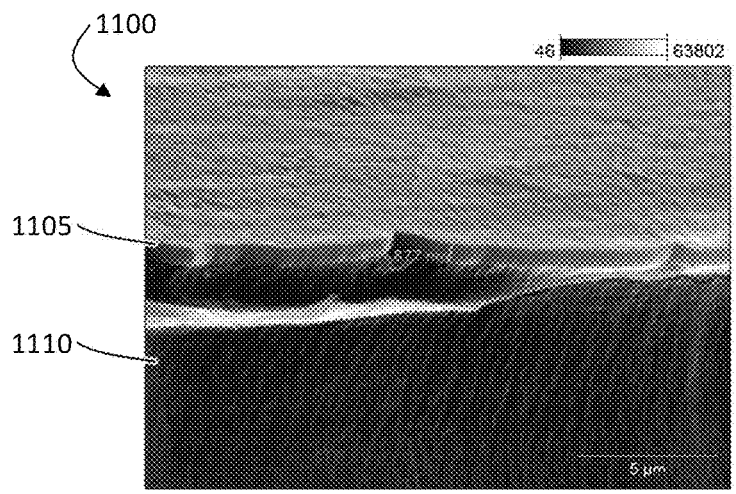
Figure 11C:
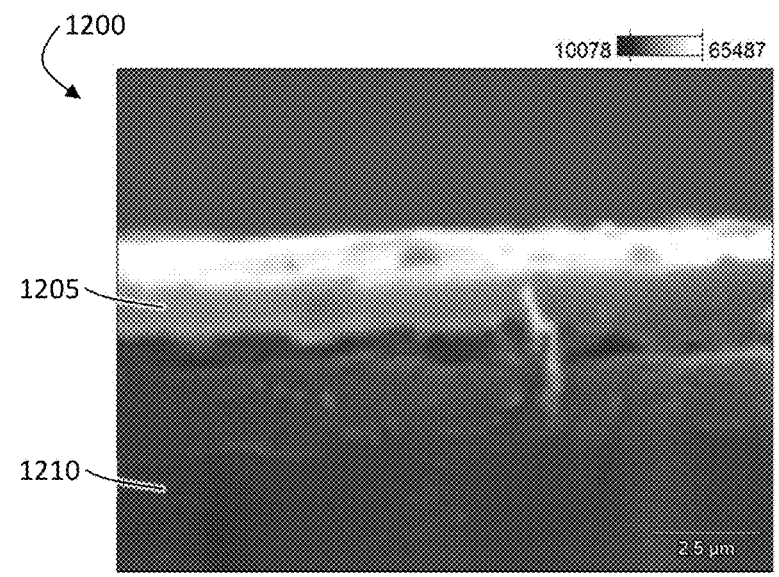

Next, a layer of lithium oxysulfide, an ion conductor, was deposited onto the separator to form an ion conductor layer by e-beam evaporation. The major components of the lithium oxysulfide layer were lithium, silicon, sulfur and oxygen, with the following ratios: 1.5:1 for Si:O, 4.5:1 for S:O, and 3.1:1 for S:Si. In three experiments, the thickness of the ion conductor layer ranged from about 600-800 nm, as shown in FIGS. 11A-11C. The ratio of thickness of the ion conductor layer to pore diameter of the separator in these experiments ranged from about 3:1 to 8:1.

FIGS. 11A, 11B, and 11C are scanning electron microscopy (SEM) images showing the ion conductor (lithium oxysulfide) coating on the commercial separator. FIG. 11A is an SEM of the lithium oxysulfide coating on a 25-micron-thick separator. The thickness of the lithium oxysulfide layer was 610 nm. FIG. 11B is an SEM of a lithium oxysulfide layer on a 25 micron separator. The thickness of the lithium oxysulfide layer was 661 nm. FIG. 11C is an SEM cross-sectional image of an 800 nm thick lithium oxysulfide coating on the separator material. These images also show that the lithium oxysulfide material did not penetrate into the separator's pores.

A tape test was performed according to standard ASTM-D3359-02 to determine adhesiveness between the ion conductor layer and the separator. The test demonstrated that the ion conductor was well bonded to the separator and did not delaminate from the separator.

This example shows that pre-treatment of the surface of the separator with plasma prior to deposition of an ion conductor (lithium oxysulfide) layer enhanced adhesion of the ion conductor layer to the separator, compared to the absence of a pre-treatment step (Comparative Example 1).

Example 1B

An ion conductor-separator composite similar to that described in Example 1A was formed except the lithium oxysulfide ion conductor layer had a thickness of 1 micron. The surface of the separator was treated to plasma as described in Example 1A prior to deposition of the lithium oxysulfide layer.

The final composite demonstrated 17 times reduced air permeation rates compared with an untreated separator (i.e., a separator that was not treated to plasma prior to deposition of the lithium oxysulfide layer, Comparative Example 1), as determined by a Gurley test performed with a pressure differential of 3 kPa (TAPPI Standard T 536 om-12). The final composite had an air permeation time of over 168 minutes, compared to about 9.7 minutes for the composite including the untreated separator (Comparative Example 1).

This example shows that pre-treatment of the surface of the separator with plasma prior to deposition of an ion conductor (lithium oxysulfide) layer enhanced air permeation time of the composite, compared to a composite that included an untreated separator (Comparative Example 1).

Comparative Example 1

The following is a comparative example describing an ion conductor layer that was poorly bonded to a separator.

The method described in Example 1 was used to form an ion conductor-separator composite, except here the separator was not treated with plasma prior to deposition of the ion conductor layer.

The ion conductor-separator composite did not pass the tape test, demonstrating delamination of the ion conductor layer from the separator.

At a ceramic thickness of 1 micron, the air permeation time was below 9.7 minutes as determined by a Gurley Test (TAPPI Standard T 536 om-12).

Example 2

This example shows the formation and performance of the ion conductor-separator composite of Example 1 in a lithium-sulfur electrochemical cell.

The ion conductor (lithium oxysulfide)-coated separator of Example 1 was vacuum coated with metallic lithium (~25 microns of lithium deposited on top of the lithium oxysulfide layer). The lithium anode was protected with the lithium oxysulfide-coated separator and was assembled into a lithium-sulfur battery cell.

The cathode contained 55% weight percent sulfur, 40% weight percent of carbon black and 5% weight percent of polyvinyl alcohol binder. The sulfur surface loading was approximately 2 mg/cm$^2$.

The active electrode covered a total surface area of 16.57 cm$^2$. The lithium-sulfur battery cells were filled with an electrolyte containing 16% weight percent of lithium bis (Trifluoromethanesulfonyl)imide, 42% weight percent of dimethoxyethane, and 42% weight percent of 1,3-dioxolane solvents.

The lithium-sulfur battery cells were discharged at 3 mA to 1.7 V and were charged at 3 mA. Charge was terminated when the lithium-sulfur battery cell reached 2.5 V or when charge time exceeded 15 hours if the cells were not able reaching 2.5 V.

The lithium-sulfur battery cells were cycled over 30 times and showed the ability to reach 2.5 V at every cycle, demonstrating that the lithium oxysulfide layer performed well as a barrier, protecting lithium from the polysulfide shuttle. Multiple cells autopsied after 10 charge cycles showed no defects in the lithium oxysulfide layer and showed no evidence of lithium metal deposition on top of the lithium oxysulfide layer. All lithium was deposited under the lithium oxysulfide layer. Autopsies also showed that the ceramic and separator materials were well bonded after cycling.

Comparative Example 2

This example shows the formation and performance of the ion conductor-separator composite of Comparative Example 1 in a lithium-sulfur electrochemical cell.

Anodes with vacuum deposited lithium on the top of the ion conductor-separator composite of Comparative Example 1 were assembled into lithium-sulfur battery cells and tested similarly as described in Example 2.

These cells were unable to be charged to 2.5 V over 30 cycles. Instead, charge time was at least 15 hours and charge voltage leveled at 2.37-2.41 V. These results demonstrate that the lithium was not protected from the polysulfide shuttle during cycling. Autopsy showed that the lithium oxysulfide layer had defects and a substantial portion of lithium (~20-30% of the surface area) was deposited on the top of this layer.

Example 3

This example demonstrates the ability of ion conductor-separator composites (fabricated similarly to the method described in Example 1) to act as a barrier to fluids, as demonstrated by air permeation testing (Gurley test). Each of the samples included a 25 micron thick separator with pore diameters ranging between 0.1 micron to 0.5 microns, and a coating of lithium oxysulfide on top of the separator. Samples 1, 2, 3, and 6 included separators that were plasma treated before the addition of the lithium oxysulfide. Samples 4, 5, and 7 included separators that were untreated before the addition of the lithium oxysulfide layer.

Figure 12:
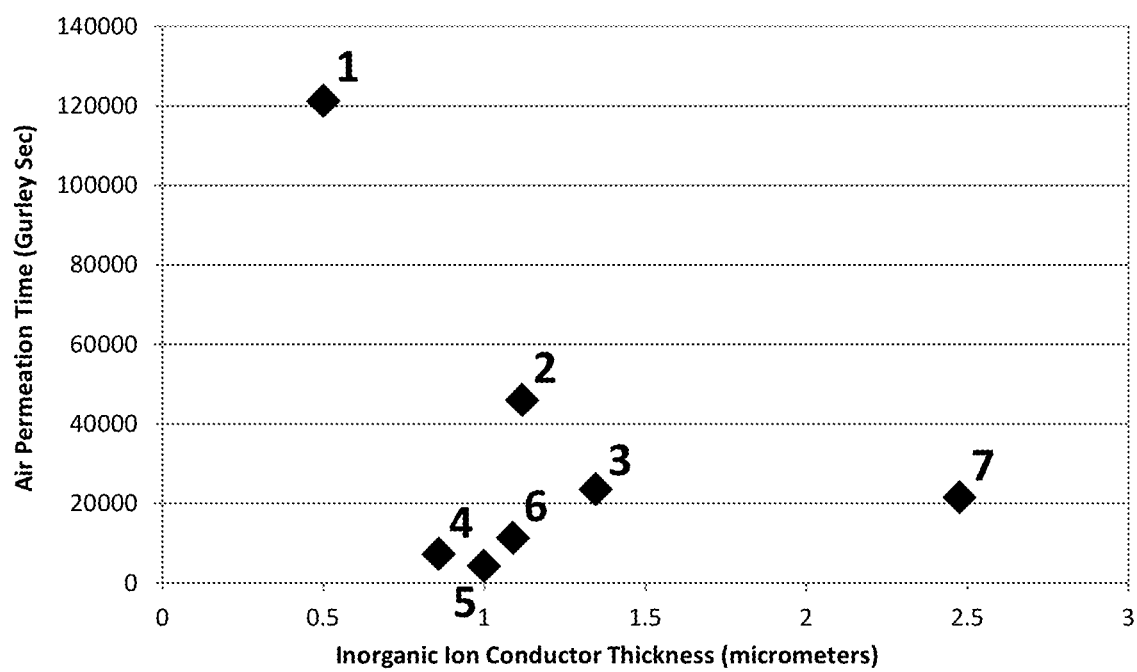
FIG. 12 is a plot of air permeation time versus inorganic ion conductor thickness for various inorganic ion conductor-separator composites.

FIG. 12 is a graph showing air permeation time versus ion conductor layer thickness for composites including plasma treated and untreated separators. The figure highlights the improvement in air permeation times with plasma treatment of the separator before applying the lithium oxysulfide coating, i.e., samples 1, 2, 3, and 6, compared to composites that included separators that were untreated before the addition of the lithium oxysulfide layer (samples 4, 5, and 7).

This example demonstrates that air permeation time generally increases when the surface of the separator of the is subjected to plasma treatment prior to deposition of the oxysulfide layer, which promotes sufficient bonding between the oxysulfide layer and the separator. The absence of plasma treatment resulted in delamination of the oxysulfide layer, and therefore leads to poorer barrier properties. This example also shows that the highest air permeation time (and, therefore, enhanced barrier properties) was achieved with a lithium oxysulfide layer having a thickness of 0.5 microns (sample 1). This data suggests that thinner lithium oxysulfide layers generally lead to improved barrier properties compared to composites having thicker lithium oxysulfide layers, with the combination of a thin lithium oxysulfide layer and a plasma treated separator showing the highest air permeation time (and, therefore, enhanced barrier properties).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
   a first electrode comprising an electroactive material, wherein the first electrode is a negative electrode;
   a second electrode; and
   a composite positioned between the first and second electrodes, the composite comprising:
      a separator comprising pores, wherein the separator has a bulk electronic resistivity of at least $10^4$ Ohm-meters; and
      an inorganic ion conductor layer bonded to the separator and positioned directly adjacent to the first electrode, wherein the composite has an air permeation time of at least 20,000 Gurley-s and at most 200,000 Gurley-s according to Gurley test TAPPI Standard T 536 om-12.

2. The electrochemical cell of claim 1, wherein the inorganic ion conductor layer is bonded to the separator by covalent bonding.

3. The electrochemical cell of claim 1, wherein the air permeation time of the composite is at least 40,000 Gurley-s and at most 200,000 Gurley-s.

4. The electrochemical cell of claim 1, wherein the composite is formed by subjecting a surface of the separator to a plasma and then depositing the inorganic ion conductor layer on the surface of the separator.

5. The electrochemical cell of claim 1, wherein the separator has a thickness between 5 microns and 40 microns.

6. The electrochemical cell of claim 1, wherein the bulk electronic resistivity of the separator is at least $10^{10}$ Ohm-meters and/or less than or equal to $10^{15}$ Ohm-meters.

7. The electrochemical cell of claim 1, wherein the separator is a solid, polymeric separator.

8. The electrochemical cell of claim 1, wherein the separator comprises one or more of poly(n-pentene-2), polypropylene, polytetrafluoroethylene, a polyamide, and polyether ether ketone (PEEK).

9. The electrochemical cell of claim 1, wherein the inorganic ion conductor layer comprises an inorganic ion conductor material, and wherein the pores of the separator are substantially unfilled with the inorganic ion conductor material.

10. The electrochemical cell of claim 1, wherein the inorganic ion conductor layer comprises an inorganic ion conductor material, and wherein at least a portion of the pores of the separator are filled with the inorganic ion conductor material.

11. The electrochemical cell of claim 1, wherein an average pore size of the separator is less than or equal to 5 microns.

12. The electrochemical cell of claim 1, wherein the inorganic ion conductor layer has a thickness of less than or equal to 2 microns.

13. The electrochemical cell of claim 1, wherein the inorganic ion conductor layer comprises a ceramic, a glass, and/or a glass-ceramic.

14. The electrochemical cell of claim 1, wherein the composite has a lithium ion conductivity of at least $10^{-5}$ S/cm at 25 degrees Celsius.

15. The electrochemical cell of claim 1, wherein a strength of adhesion between the separator and the inorganic ion conductor layer passes the tape test according to the standard ASTM D3359-02.

16. The electrochemical cell of claim 1, wherein the electrochemical cell comprises an electrolyte, and wherein separator swells in the electrolyte.

17. The electrochemical cell of claim 1, wherein the inorganic ion conductor layer comprises a metal oxide of the metal ion conductive in the inorganic ion conductor layer.

18. The electrochemical cell of claim 1, wherein the inorganic ion conductor layer comprises one or more of a lithium nitride, a lithium silicate, a lithium borate, a lithium aluminate, a lithium phosphate, a lithium phosphorus oxynitride, a lithium borosulfide, a lithium aluminosulfide, a lithium phosphosulfide, and a lithium oxysulfide.

19. The electrochemical cell of claim 1, wherein the first electrode comprises lithium metal and/or a lithium metal alloy, and wherein the inorganic ion conductor layer is conductive to lithium ions.

20. The electrochemical cell of claim 1, wherein the inorganic ion conductor layer serves as a solvent barrier.

21. The electrochemical cell of claim 1, wherein the inorganic ion conductor layer functions as a protective structure within the electrochemical cell.

* * * * *